US008533552B2

(12) United States Patent
Chang et al.

(10) Patent No.: US 8,533,552 B2
(45) Date of Patent: *Sep. 10, 2013

(54) APPARATUS AND METHOD FOR RETRANSMITTING REQUEST IN WIRELESS RELAY COMMUNICATION SYSTEM

(75) Inventors: Young-Bin Chang, Anyang-si (KR); Taori Rakesh, Suwon-si (KR); Chang-Yoon Oh, Yongin-si (KR); Sung-Jin Lee, Seoul (KR); Hyun-Jeong Kang, Seoul (KR); Jung-Je Son, Seongnam-si (KR); Hyoung-Kyu Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1082 days.

This patent is subject to a terminal disclaimer.

(21) Appl. No.: 12/037,577

(22) Filed: Feb. 26, 2008

(65) Prior Publication Data
US 2008/0209299 A1    Aug. 28, 2008

(30) Foreign Application Priority Data

Feb. 26, 2007 (KR) .................. 10-2007-0019027
Mar. 5, 2007 (KR) .................. 10-2007-0021677

(51) Int. Cl.
*H04L 1/18* (2006.01)
*G08C 25/02* (2006.01)

(52) U.S. Cl.
USPC ...................... 714/748; 714/750; 714/749

(58) Field of Classification Search
USPC ............................ 714/748–751
See application file for complete search history.

(56) References Cited

U.S. PATENT DOCUMENTS

| 7,457,631 | B2 * | 11/2008 | Yach et al. ............ 455/502 |
| 8,000,650 | B2 * | 8/2011 | Chang et al. ............ 455/11.1 |
| 8,201,044 | B2 * | 6/2012 | Chang et al. ............ 714/749 |
| 2003/0013445 | A1 * | 1/2003 | Fujiwara et al. ............ 455/435 |
| 2005/0232183 | A1 * | 10/2005 | Sartori et al. ............ 370/319 |
| 2006/0233200 | A1 | 10/2006 | Fifield et al. |
| 2007/0141991 | A1 * | 6/2007 | Hong et al. ............ 455/63.1 |

(Continued)

FOREIGN PATENT DOCUMENTS

| AU | 2008219947 | 9/2008 |
| CN | 1823489 | 8/2006 |

(Continued)

OTHER PUBLICATIONS

Haihong Zheng et al., "UL HARQ with Relays", IEEE 802.16 Broadband Wireless Access Working Group, Jan. 7, 2007.

(Continued)

*Primary Examiner* — Guy Lamarre
(74) *Attorney, Agent, or Firm* — The Farrell Law Firm, P.C.

(57) ABSTRACT

Data retransmission apparatus and method in a wireless relay communication system are provided. It is checked whether an Acknowledgement (ACK) message or a Negative ACK (NACK) message for data is received from a Relay Station (RS), which receives the data from a Mobile Station (MS). Scheduling information for transmitting the data is transmitted to the RS, when the ACK message is received from the RS. Errors are checked for in of the data, when the data is received from the RS. The RS is requested to retransmit the data, when the data has an error. Accordingly, since the RS retransmits only the error-free data to the BS, the BS can enhance the data reliability.

40 Claims, 16 Drawing Sheets

(56) References Cited

U.S. PATENT DOCUMENTS

| | | | |
|---|---|---|---|
| 2007/0171865 A1* | 7/2007 | Kato | 370/329 |
| 2008/0045141 A1* | 2/2008 | Suga | 455/7 |
| 2008/0108304 A1 | 5/2008 | Suga | |

FOREIGN PATENT DOCUMENTS

| | | |
|---|---|---|
| EP | 1 361 689 | 9/2007 |
| EP | 1 863 210 | 12/2007 |
| EP | 1 921 800 | 5/2008 |
| EP | 2 068 487 | 6/2009 |
| GB | 2 417 862 | 3/2006 |
| GB | 2417862 A * | 3/2006 |
| JP | 2007-504750 | 3/2007 |
| JP | 2007-531340 | 11/2007 |
| JP | 2008-118499 | 5/2008 |
| WO | WO 2005/008947 | 1/2005 |
| WO | WO 2008/105620 | 9/2008 |

OTHER PUBLICATIONS

Haihong Zheng et al., "HARQ with Relays", IEEE 802.16 Presentation Submission Template (Rev.8.3), Nov. 7, 2006.

* cited by examiner

APPARATUS AND METHOD FOR RETRANSMITTING REQUEST IN WIRELESS RELAY COMMUNICATION SYSTEM

PRIORITY

This application claims priority under 35 U.S.C. §119(a) of a Korean patent application filed in the Korean Intellectual Property Office on Feb. 26, 2007 and assigned Serial No. 2007-19027, and a Korean patent application filed in the Korean Intellectual Property Office on Mar. 5, 2007 and assigned Serial No. 2007-21677, the entire disclosures of which are incorporated herein by reference.

BACKGROUND OF THE INVENTION

1. Field of the Invention

The present invention relates generally to an apparatus and a method for performing an Automatic Retransmission reQuest (ARQ) in a wireless communication system, and more particularly, to an apparatus and a method for performing the ARQ in a wireless relay communication system.

2. Description of the Related Art

A wireless communication system is subject to error in specific data depending on a channel condition of a radio resource. An error control and recovery method largely includes an ARQ scheme and a Frame Error Check (FEC) scheme. The ARQ scheme requests the retransmission of the compromised data from a receiver to a sender. The FEC scheme corrects the error of the compromised data at the receiver.

When the wireless communication system adopts the ARQ scheme, the receiver checks whether an error occurs by decoding the received packet. When the received packet does not have an error, the receiver sends an acknowledgement (ACK) signal to the sender.

When the received packet has an error, the receiver sends a Negative ACK (NACK) signal to the sender.

Upon receiving the ACK signal from the receiver, the sender transmits a new packet. Upon receiving the NACK signal from the receiver, the sender retransmits the packet to the receiver.

Recently, wireless communication systems have applied a relay scheme using a relay station to provide a better radio channel to a terminal in a cell boundary or a shadow area. In other words, the wireless relay communication system can provide the better radio channel between a base station and the terminal by relaying data between the base station and the terminal via the relay station. The wireless relay communication system therefore requires an ARQ method using the relay station.

SUMMARY OF THE INVENTION

The present invention has been made to address at least the above-mentioned problems and/or disadvantages and to provide at least the advantages described below. Accordingly, an aspect of the present invention is to provide an apparatus and a method for performing an ARQ in a wireless relay communication system.

Another aspect of the present invention is to provide an apparatus and a method for performing an ARQ of an uplink signal in a wireless relay communication system.

The above aspects are achieved by providing a retransmission method of a Base Station (BS) in a wireless relay communication system. It is checked whether an Acknowledgement (ACK) message or a Negative ACK (NACK) message for data is received from a Relay Station (RS), which receives the data from a Mobile Station (MS). Scheduling information for transmitting the data is transmitted to the RS, when the ACK message is received from the RS. An error of the data is checked, when the data is received from the RS. The RS is requested to retransmit the data, when the data has an error.

According to one aspect of the present invention, a retransmission method of an RS in a wireless relay communication system is provided. Data is received from an MS using scheduling information for the MS to transmit data. An error of the received data is checked. An ACK message is transmitted to a BS when the data has no error. The data is forwarded to the BS using scheduling information, which is provided from the BS, for forwarding the data from the MS. The data is retransmitted to the BS, when a retransmission request signal is received from the BS.

According to another aspect of the present invention, a retransmission method of a BS in a wireless relay communication system is provided. An error of the data is checked, when data is received from an MS. It is checked whether an ACK message or a NACK message is received with respect to data sent from the MS to an RS, when the data has an error. A node is determined for the data retransmission, when receiving an ACK message from the RS. The data retransmission to the RS is requested, when the RS is selected as the node for the retransmission.

According to a further aspect of the present invention, a retransmission method of an RS in a wireless relay communication system is provided. Scheduling information is confirmed for an MS to send data. Data is received from the MS using the scheduling information. An error of the received data is checked. An ACK message is transmitted to a BS when the data has no error. The data is transmitted to the BS, when a retransmission request signal is received from the BS.

According to an additional aspect of the present invention, a retransmission method of a BS in a wireless relay communication system is provided. Scheduling information for an MS and an RS to send data is transmitted to the MS and the RS. It is checked whether data is received from the RS, which receives the data from the MS. An error of the data is checked, when receiving the data from the RS. Retransmission of the data to the RS is requested, when the data has an error.

According to yet another aspect of the present invention, a retransmission method of an RS in a wireless relay communication system is provided. Data is received from an MS using scheduling information for the MS to send data. An error of the received data is checked. The data is forwarded to the BS, when the data has no error. The data is retransmitted to the BS, when a retransmission request signal is received from the BS.

According to a further aspect of the present invention, an RS of a wireless relay communication system is provided. The RS includes a checker for checking an error of data received from an MS, a data queue for storing error-free data, and a retransmission controller for controlling the data retransmission according to a retransmission request of a BS. The RS also includes a data generator for generating data to be retransmitted to the BS using the data stored to the data queue under control of the retransmission controller, and a sender for transmitting the generated data to the BS.

BRIEF DESCRIPTION OF THE DRAWINGS

The above and other aspects, features and advantages of the present invention will become more apparent from the following detailed description when taken in conjunction with the accompanying drawings, in which.

DETAILED DESCRIPTION OF THE PREFERRED EMBODIMENTS

Figure 1:
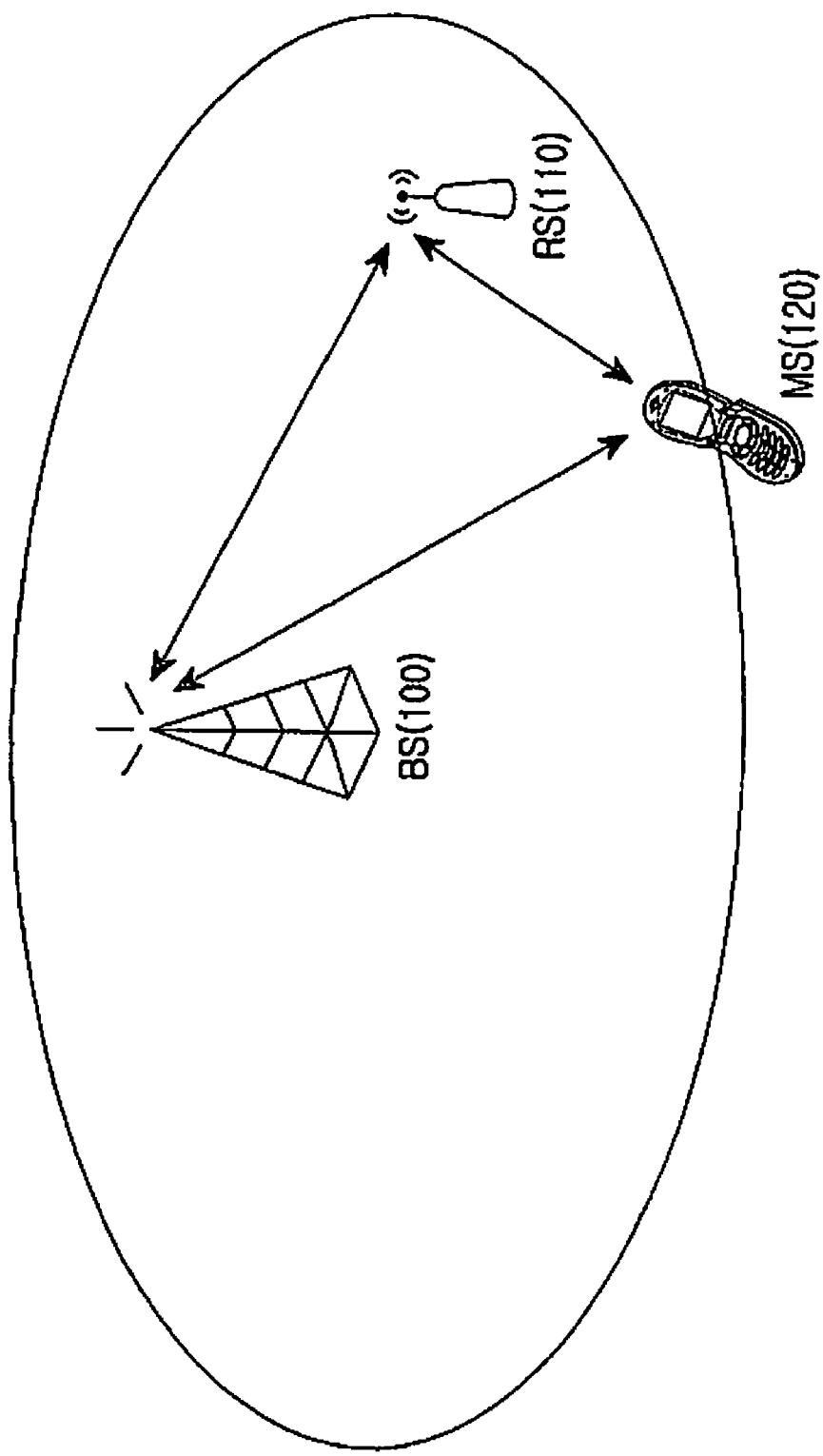
FIG. 1 is a diagram illustrating a wireless relay communication system according to an embodiment of the present invention.

Preferred embodiments of the present invention are described in detail below with reference to the accompanying drawings. It should be noted that the same or similar components are designated by the same or similar reference numerals although used in different drawings. Detailed descriptions of constructions or processes known in the art may be omitted to avoid obscuring the subject matter of the present invention.

The present invention provides a technique for performing an ARQ of an uplink in a wireless relay communication system.

Hereinafter, the wireless relay communication system employs an Orthogonal Frequency Division Multiple Access (OFDMA) by way of example. The present invention is also applicable to other multiple access communication systems.

To provide a relay service, the wireless communication system is constructed as shown in FIG. 1.

FIG. 1 depicts the wireless relay communication system according to an embodiment of the present invention.

In the wireless communication system of FIG. 1, a Base Station (BS) 100 services a Mobile Station (MS) 120 in its service coverage through a direct link.

When the MS 120 travels in the outskirts (the cell boundary) of the service coverage of the BS 100 or in a shadow area, the BS 100 provides a high-speed data channel to the MS 120 using a relay link via a Relay Station (RS) 110.

For instance, in a downlink, the MS 120 receives a control signal and low speed data through the direct link to the BS 100 because it belongs to the service coverage of the BS 100. The MS 120 receives high-speed data from the BS 100 via the RS 110.

In an uplink, the BS 100 receives a control signal and a low speed data channel from the MS 120 through the direct link. The BS 100 receives high-speed data from the MS 120 via the RS 110.

As above, the BS, the RS, and the MS in the wireless relay communication system can communicate with each other.

Namely, the MS can communicate with the BS through the direct link or through the relay link via the RS depending on the channel condition.

If the MS and the BS communicate with each other through the direct link, the RS can listen to data transmitted from the MS to the BS. Hence, when error occurs in the data received at the BS, the BS can select a node for retransmitting the data. For example, the BS can request the retransmission of the data by checking data reception rates from the MS and the RS and selecting a node of the good data reception rate.

Now, a method for retransmitting an uplink signal in the wireless communication system is explained.

Figure 2:
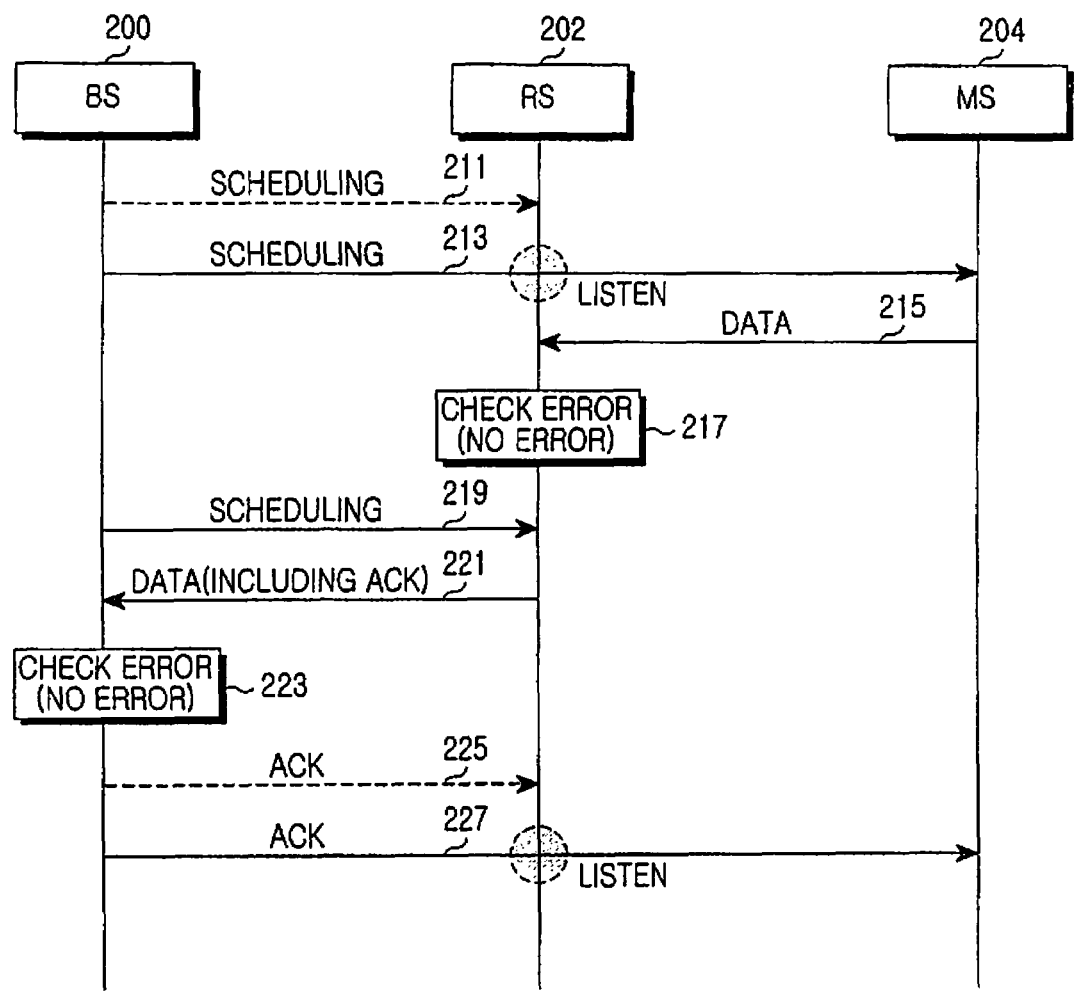
FIG. 2 is a diagram illustrating an uplink signal retransmission method in the wireless relay communication system according to an embodiment of the present invention.
Figure 3:
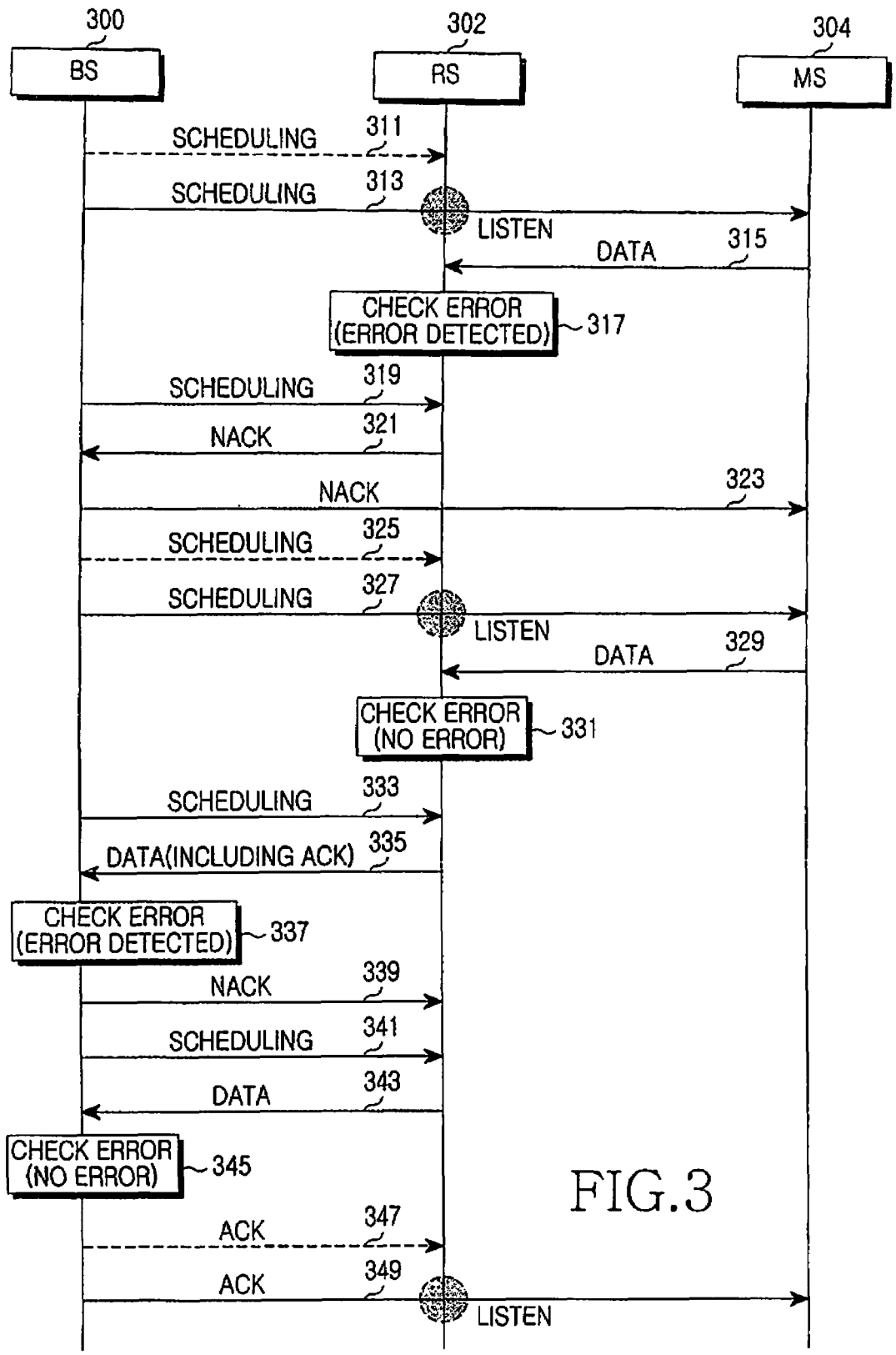
FIG. 3 is a diagram illustrating an uplink signal retransmission method in the wireless relay communication system according to another embodiment of the present invention.

When the RS retransmits uplink data errored at the BS, the wireless communication system operates as shown in FIG. 2 or FIG. 3.

FIG. 2 illustrates the uplink signal retransmission method in the wireless relay communication system according to an embodiment of the present invention.

In FIG. 2, the BS 200 transmits resource scheduling information for data transmission of the MS 204 to the MS 204 in steps 211 and 213. For example, the BS 200 transmits the scheduling information to the MS 204 via the RS 202 or to the RS 202 and the MS 204 respectively.

Alternatively, the BS 200 transmits the scheduling information directly to the MS 204. The RS 202 can acquire the scheduling information of the MS 204 by listening to the scheduling information transmitted from the BS 200 to the MS 204. Herein, the MS 204 indicates a terminal, which can receive the relay service via the RS 202.

The RS 202 and the MS 204 confirm a time point of the data transmission from the MS 204 and the resource information using the scheduling information received from the BS 200.

Next, the MS 204 transmits data to the RS 202 according to the scheduling information in step 215. If the MS 204 cannot recognize the RS 202, the MS 204 may send the data to the BS

200. In this case, the RS 202 listens to and confirms the data transmitted from the MS 204 to the BS 200 according to the scheduling information.

The RS 202 checks for errors in the data received from the MS 204 in step 217. For example, the RS 202 checks for errors in the data using a Cyclic Redundancy Check (CRC) code of the data.

In doing so, the BS 200 can know the time point of the data transmission from the MS 204 to the RS 202 according to the scheduling information transmitted to the MS 204. Accordingly, the BS 200 transmits scheduling information to the RS 202 so that the RS 202 forwards the data from the MS 204 to the BS 200, by taking into account the data transmission time of the MS 204 in step 219.

When the data received from the MS 204 has no error, the RS 202 forwards the data to the BS 200 using the scheduling information received in step 219, in step 221. At this time, the RS 202 transmits the data including an ACK message.

The BS 200 checks for errors in the data received from the RS 202 in step 223. For example, the BS 200 checks the data for errors using the CRC of the data.

When the data received from the RS 202 has no error, the BS 200 sends an ACK message to the RS 202 or the MS 204 in step 225 or 227. For example, the BS 200 sends the ACK message to each of the RS 202 and the MS 204, or to the MS 204 via the RS 202.

Alternatively, the BS 200 can send the ACK message only to the MS 204. In this situation, the RS 202 confirms that there is no error in the data transmitted to the BS 200 by listening to the ACK message transmitted from the BS 200 to the MS 204. When the NACK message or the scheduling information for the data retransmission is not received from the BS 200 over a certain time, the RS 202 regards the data transmitted to the BS 200 as having no errors.

In this embodiment of the present invention, the BS 200, upon receiving the error-free data from the MS 204 via the RS 202, sends the ACK message to the RS 202 or the MS 204. Alternatively, when receiving the data including the ACK message from the RS 202 as in step 221, the BS 200 sends the ACK message to the MS 204 regardless of the error in the data received from the RS 202. When the data received from the RS 202 has no error, the BS 200 sends the ACK message to the RS 202 or does not send the ACK message.

FIG. 3 illustrates an uplink signal retransmission method in the wireless relay communication system according to another embodiment of the present invention. Hereafter, it is assumed that the data transmitted from the MS 204 to the RS 202 and the data transmitted from the RS 202 to the BS 200 have error in FIG. 2.

In FIG. 3, a BS 300 transmits resource scheduling information for data transmission of an MS 304, to the MS 304 in steps 311 and 313. For example, the BS 300 transmits the scheduling information to each of an RS 302 and the MS 304, or to the MS 304 via the RS 302.

Alternatively, the BS 300 transmits the scheduling information only to the MS 304. The RS 302 can acquire the scheduling information of the MS 304 by listening to the scheduling information transmitted from the BS 300 to the MS 304. Herein, the MS 304 indicates a terminal, which can receive the relay service through the RS 302.

The RS 302 and the MS 304 confirm the time point of the data transmission of the MS 304 and the resource information using the scheduling information received from the BS 300.

Next, the MS 304 transmits data to the RS 302 according to the scheduling information in step 315. If the MS 304 cannot recognize the RS 302, the MS 304 may transmit the data to the BS 300. In this case, the RS 302 listens to and acquires the data transmitted from the MS 304 to the BS 300 according to the scheduling information.

The RS 302 checks for errors in the data received from the MS 304 in step 317. For example, the RS 302 checks for errors using the CRC of the data.

The BS 300 can recognize the time information of the data transmission from the MS 304 to the RS 302 according to the scheduling information received from the MS 304. Hence, the BS 300 transmits scheduling information for the RS 302 to forward the data from the MS 304 to the BS 300, to the RS 302 by taking into account the time point of the data transmission of the MS 302 in step 319.

If the data received from the MS 304 has an error, the RS 302 sends a NACK message to the BS 300 using the scheduling information in step 321.

Upon receiving the NACK message from the RS 302, the BS 300 sends a NACK message to the MS 304 to request the retransmission in step 323.

Next, the BS 300 transmits scheduling information for the MS 304 to retransmit the data, to the MS 304 in steps 325 and 327. For example, the BS 300 transmits the scheduling information to each of the RS 302 and the MS 304, or to the MS 304 via the RS 302.

Alternatively, the BS 300 can transmit the scheduling information only to the MS 304. The RS 302 can listen to and acquire the scheduling information transmitted from the BS 300 to the MS 304.

The RS 302 and the MS 304 confirm the time point and the resource information of the data retransmission of the MS 304 using the scheduling information received from the BS 300.

Next, the MS 304 retransmits the data to the RS 302 according to the scheduling information in step 329. If the MS 304 cannot recognize the RS 302, the MS 304 can retransmit the data to the BS 300. In this case, the RS 302 listens to and acquires the data retransmitted from the MS 304 to the BS 300 according to the scheduling information.

The RS 302 checks for errors in the data retransmitted from the MS 304 in step 331. For example, the RS 302 checks for errors using the CRC of the data.

The BS 300 can acquire the time point information of the data retransmission from the MS 304 to the RS 302 according to the scheduling information received from the MS 304. Thus, the BS 300 transmits scheduling information for the RS 302 to forward the retransmitted data from the MS 304 to the BS 300, to the RS 302 by taking into account the data retransmission time point of the MS 302 in step 333.

When the data retransmitted from the MS 304 has no error, the RS 302 forwards the retransmitted data from the MS 304 to the BS 300 using the scheduling information received in step 333, in step 335. In doing so, the RS 302 transmits the data including the ACK message.

The BS 300 checks for errors in the data received from the RS 302 in step 337. For example, the BS 300 checks for errors using the CRC of the data.

When the data received from the RS 302 has an error, the BS 300 sends a NACK message and scheduling information for retransmitting the data to the RS 302 in steps 339 and 341. The BS 300 may transmit merely the scheduling information for the data retransmission to the RS 302.

Receiving the NACK message from the BS 300, the RS 302 recognizes that the data transmitted to the BS 300 has an error. Accordingly, in step 343, the RS 302 retransmits the data to the BS 300 according to the scheduling information received from the BS 300 in step 341.

In step 345, the BS 300 checks for errors in the data retransmitted from the RS 302. For example, the BS 300 checks the data error using the CRC of the data.

When the data received from the RS 302 has no errors, the BS 300 sends an ACK message to the RS 302 or the MS 304 in step 347 or 349. For example, the BS 300 sends the ACK message to each of the RS 302 and the MS 304, or to the MS 304 via the RS 302.

Alternatively, the BS 300 can send the ACK message only to the MS 304. The RS 302 confirms that there are no errors in the data transmitted to the BS 300 by listening to the ACK message sent from the BS 300 to the MS 304. When the NACK message or the scheduling information for the data retransmission is not received from the BS 300 for a certain time, the RS 302 regards the data transmitted to the BS 300 as having no errors.

In this embodiment of the present invention, the BS 300, upon receiving the error-free data from the MS 304 via the RS 302, sends the ACK message to the RS 302 or the MS 304. Alternatively, when receiving the data including the ACK message from the RS 302 as in step 335, the BS 300 sends the ACK message to the MS 304 regardless of the error in the data received from the RS 302. In this case, when the data received from the RS 302 has no error, the BS 300 sends the ACK message to the RS 302 or does not send the ACK message.

In the following, operations of the BS, the RS, and the MS for the uplink data retransmission of FIG. 2 or 3 are described.

Figure 4:
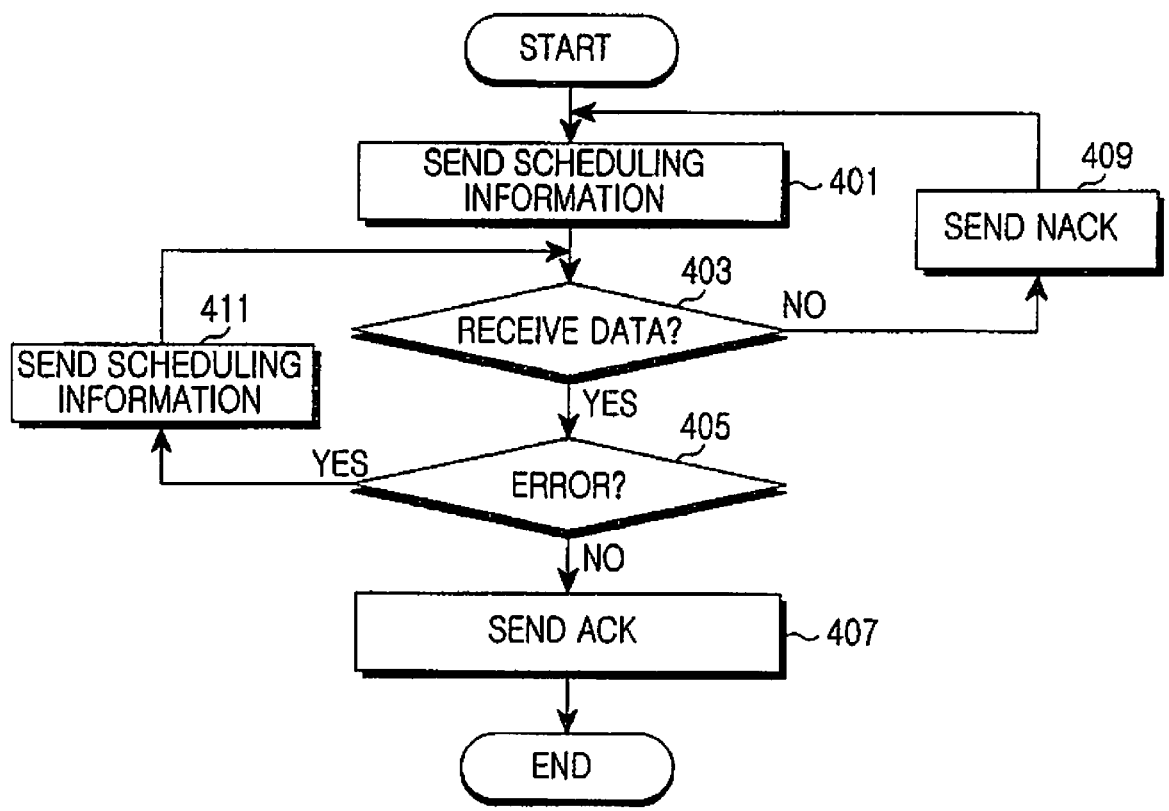
FIG. 4 is a flow diagram illustrating operations of a base station for retransmitting the uplink signal in the wireless relay communication system according to an embodiment of the present invention.

FIG. 4 illustrates the operations of the BS for retransmitting the uplink signal in the wireless relay communication system according to an embodiment of the present invention. Herein, it is assumed that the BS sends the ACK message to the RS or the MS when the uplink data of the MS received via the RS has no errors.

In step 401, the BS transmits the scheduling information for the RS and the MS to transmit the uplink data, to the RS and the MS. For example, the BS transmits the scheduling information of the MS to the RS and the MS respectively, or to the MS via the RS. Alternatively, the BS transmits the scheduling information only to the MS. The RS can acquire the scheduling information of the MS by listening to the scheduling information transmitted from the BS to the MS.

Also, the BS transmits the scheduling information for the RS to forward the data from the MS to the BS, to the RS. Herein, the BS transmits the scheduling information to the RS by considering the time point of the data transmission from the MS to the RS.

In step 403, the BS checks whether the data including the ACK message is received from the RS according to the scheduling information for the RS to forward the data from the MS.

When the NACK message, rather than the ACK message, is received according to the scheduling information, the BS sends the NACK message to request the data retransmission to the MS in step 409.

By contrast, when the data including the ACK message is received according to the scheduling information, the BS checks the data for errors in step 405. For example, the BS checks the data for errors using the CRC.

When the data has an error, the BS transmits the scheduling information for the data retransmission to the RS in step 411. For example, after sending the NACK message to the RS, the BS transmits the scheduling information for the data retransmission. Alternatively, the BS can transmit merely the scheduling information for the data retransmission to the RS.

By contrast, when the data has no error, the BS sends the ACK message to the RS or the MS in step 407. For instance, the BS sends the ACK message to each of the RS and the MS, or to the MS via the RS. Alternatively, the BS can send the ACK message only to the MS.

Next, the BS finishes this process.

As described above, when the data has an error, the BS performs the retransmission by requesting the data retransmission to the RS or the MS. The BS finishes the retransmission process when a retransmission lifetime expires.

Figure 5:
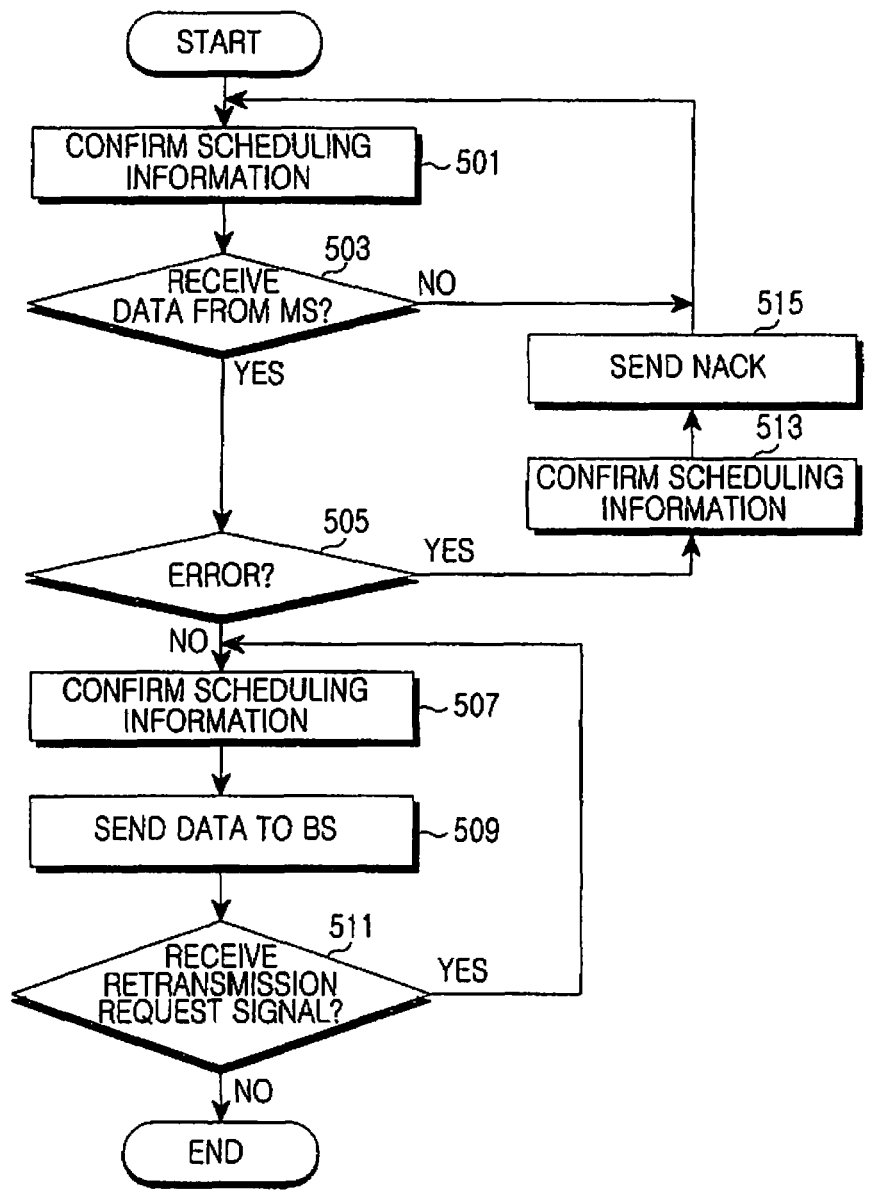
FIG. 5 is a flow diagram illustrating operations of a relay station for relaying the uplink signal in the wireless relay communication system according to an embodiment of the present invention.

FIG. 5 illustrates the operations of the RS for relaying the uplink signal in the wireless relay communication system according to an embodiment of the present invention.

In step 501, the RS checks the uplink scheduling information of the MS. For example, the RS receives the uplink scheduling information of the MS from the BS. Alternatively, the RS acquires the scheduling information by listening to the uplink scheduling information transmitted from the BS to the MS.

In step 503, the RS checks whether data is received from the MS using the scheduling information.

When the data is not received from the MS for a certain time, the RS returns to step 501 to confirm the uplink scheduling information of the MS.

When receiving the data, the RS checks error of the data in step 505. For example, the RS checks the data error using the CRC.

When the data has an error, the RS confirms the scheduling information transmitted from the BS so that the RS can forward the data from the MS, in step 513.

In step 515, the RS sends the NACK message to the BS according to the scheduling information confirmed in step 513. Next, the RS goes to step 501 to confirm the uplink scheduling information of the MS.

When the data has no errors in step 505, the RS confirms the scheduling information transmitted from the BS so that the RS forwards the data from the MS in step 507.

In step 509, the RS forwards the data received from the MS to the BS according to the scheduling information. The data includes the ACK message.

In step 511, the RS checks whether a retransmission request signal is received from the BS. Herein, the retransmission request signal includes the NACK message or the scheduling information for the retransmission.

Receiving the retransmission request signal from the BS, the RS confirms the scheduling information for the data retransmission in step 507. For example, when receiving the NACK message from the BS, the RS recognizes the error in the data transmitted to the BS and receives the scheduling information for the data retransmission from the BS. Alternatively, when receiving the scheduling information for the data retransmission from the BS, the RS recognizes the error in the data transmitted to the BS.

Meanwhile, when no retransmission request signal is received from the BS in step 511, the RS finishes this process. For example, the RS finishes this process when the ACK message is received from the BS. Herein, the RS can confirm the ACK message by receiving the ACK message from the BS or listening to the ACK message transmitted from the BS to the MS. Alternatively, when the retransmission request signal is not received from the BS for a certain time, the RS recognizes the data transmitted to the BS as having no errors and finishes this process.

As above, the RS performs the data retransmission process according to the retransmission request of the BS. In doing so, when the retransmission lifetime expires, the RS finishes the retransmission process.

Figure 6:
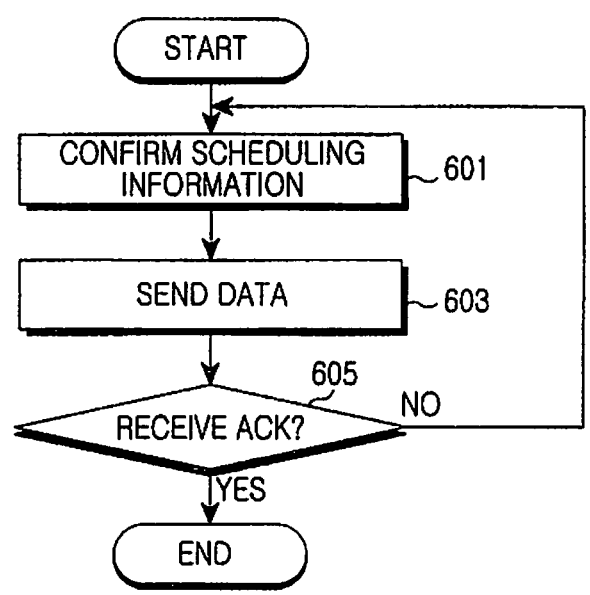
FIG. 6 is a flow diagram illustrating operations of a mobile station for relaying the uplink signal in the wireless relay communication system according to an embodiment of the present invention.

FIG. 6 illustrates the operations of the MS for relaying the uplink signal in the wireless relay communication system according to an embodiment of the present invention.

In step 601, the MS checks whether the scheduling information for transmitting the uplink data is received from the BS.

Receiving the scheduling information, the MS transmits data to the BS or the RS according to the scheduling information in step 603. For example, when the MS recognizes the RS, it can transmit the data to the RS according to the scheduling information. When not recognizing the RS, the MS transmits the data to the BS according to the scheduling information.

In step 605, the MS checks whether the ACK message is received from the BS.

When the NACK message, rather than the ACK message, is received or when the ACK message is not received over a certain time, the MS returns to step 601 and checks whether the scheduling information for the data retransmission is received from the BS. By contrast, receiving the ACK message, the MS finishes this process.

Figure 7:
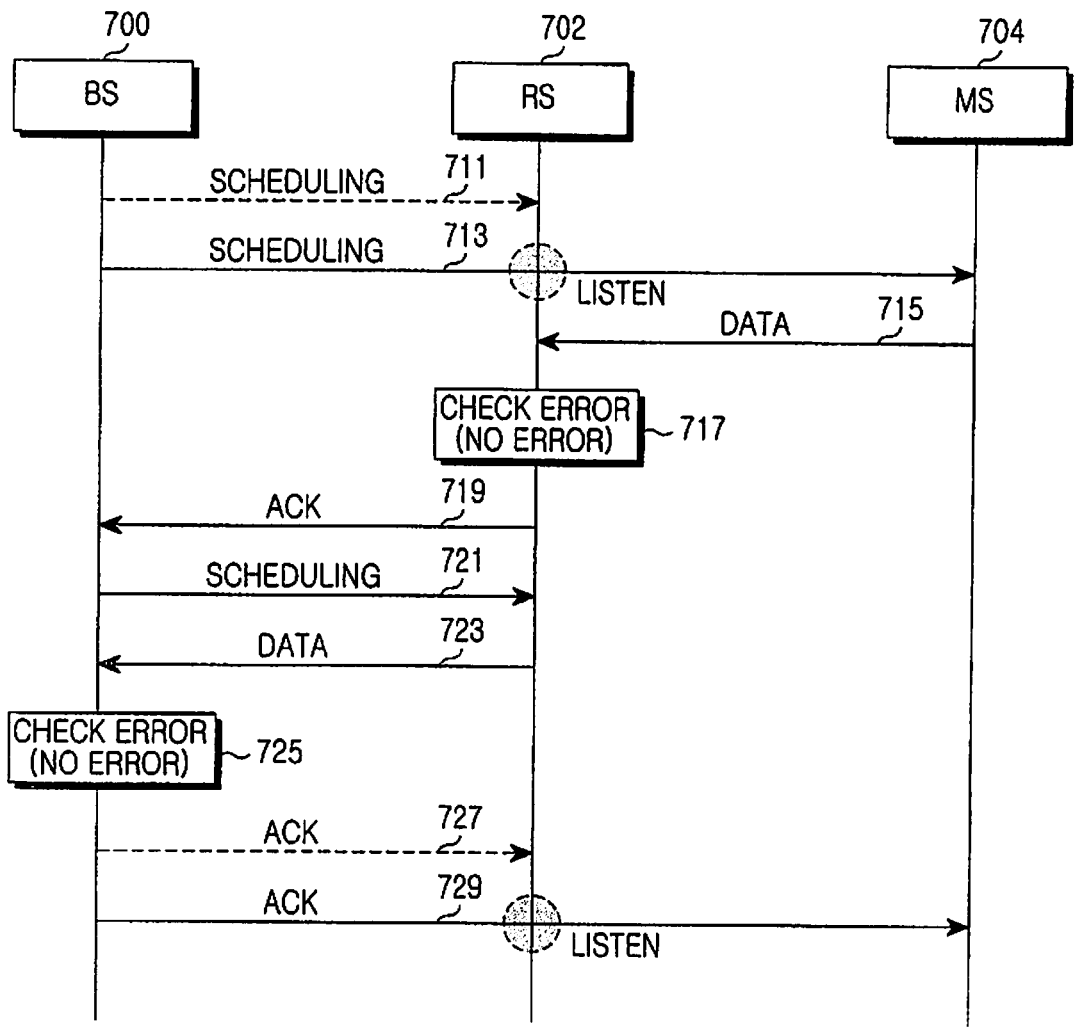
FIG. 7 is a diagram illustrating an uplink signal retransmission method in the wireless relay communication system according to yet another embodiment of the present invention.
Figure 8:
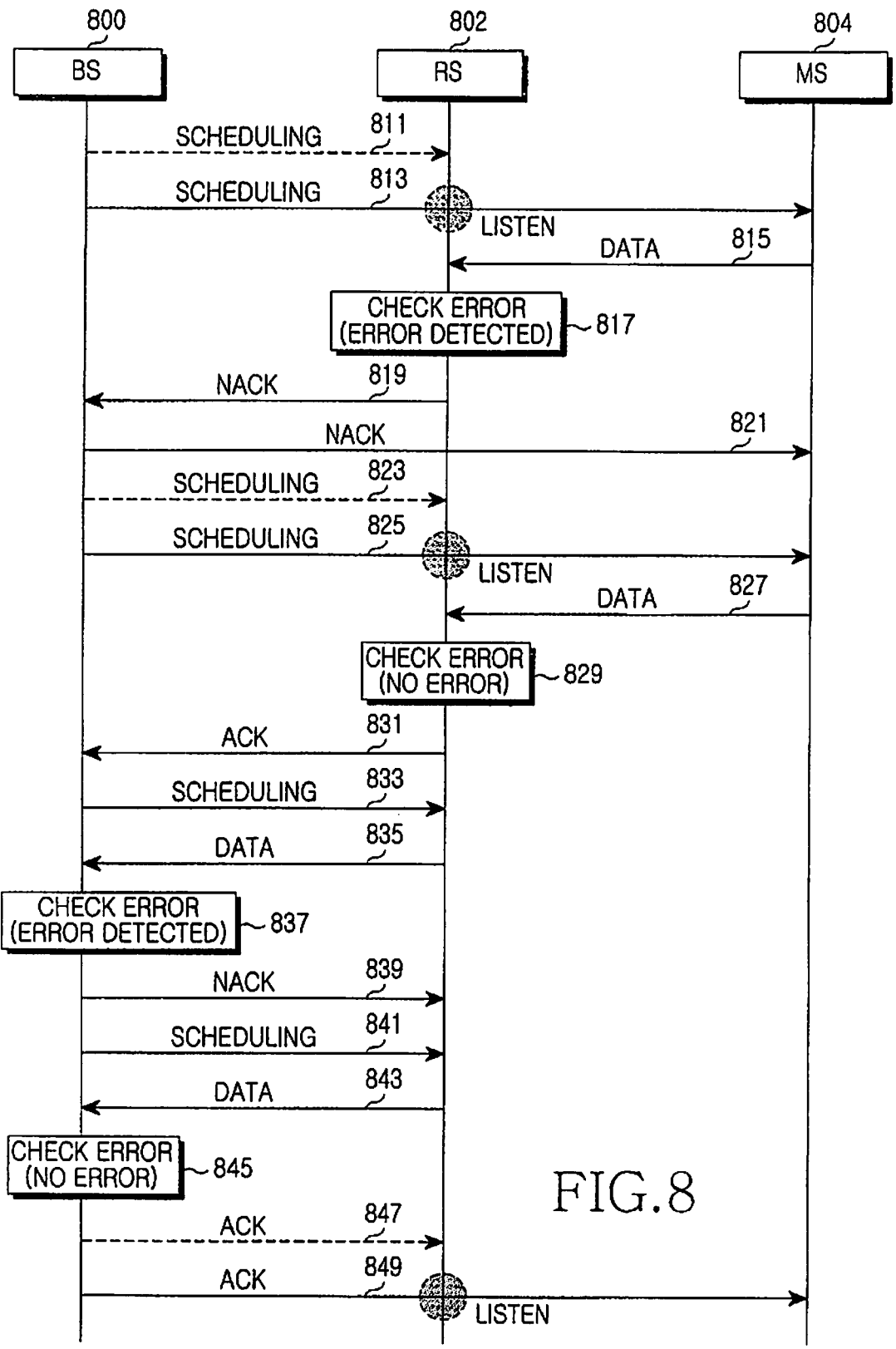
FIG. 8 is a diagram illustrating an uplink signal retransmission method in the wireless relay communication system according to still another embodiment of the present invention.

When the RS retransmits the uplink data erred at the BS, the wireless communication system operates as shown in FIG. 7 or FIG. 8.

FIG. 7 illustrates an uplink signal retransmission method in the wireless relay communication system according to another embodiment of the present invention.

A BS 700 transmits the resource scheduling information for an MS 704 to send data, to an RS 702 or the MS 704 in step 711 or 713. For example, the BS 700 transmits the scheduling information to each of the RS 702 and the MS 704, or to the MS 704 via the RS 702.

Alternatively, the BS 700 can transmit the scheduling information only to the MS 704. The RS 702 can acquire the scheduling information of the MS 704 by listening to the scheduling information transmitted from the BS 700 to the MS 704.

The RS 702 and the MS 704 confirm the time point and the resource information of the data transmission of the MS 704 using the scheduling information received from the BS 700.

In step 715, the MS 704 transmits data to the RS 702 according to the scheduling information. If the MS 704 cannot recognize the RS 702, it may transmit the data to the BS 700. The RS 702 listens to and acquires the data transmitted from the MS 704 to the BS 700 according to the scheduling information.

In step 717, the RS 702 checks for errors in the data received from the MS 704. For example, the RS 702 checks the data for errors using the CRC of the data.

When the data received from the MS 704 has no errors, the RS 702 sends the ACK message to the BS 700 according to the scheduling information received from the BS 700 for sending the ACK/NACK message in step 719. Herein, the BS 700 transmits the scheduling information for sending the ACK/NACK message to the RS 702 according to the time point of the data transmission from the MS 704 to the RS 702.

Upon receiving the ACK message from the RS 702, the BS 700 transmits the scheduling information for the RS 702 to forward the data from the MS 704 to the BS 700, to the RS 702 in step 721.

In step 723, the RS 702 forwards the data from the MS 704 to the BS 700 using the scheduling information.

In step 725, the BS 700 checks for errors in the data received from the RS 702. For example, the BS 700 checks the data for errors using the CRC of the data.

When the data received from the RS 702 has no errors, the BS 700 sends the ACK message to the RS 702 or the MS 704 in step 727 or 729. For example, the BS 700 sends the ACK message to each of the RS 702 and the MS 704, or to the MS 704 via the RS 702.

Alternatively, the BS 700 sends the ACK message only to the MS 704. The RS 702 confirms no error in the data transmitted to the BS 700 by listening to the ACK message sent from the BS 700 the MS 704. Also, when the NACK message or the scheduling information for the data retransmission is not received from the BS 700 over a certain time, the RS 702 regards as no error in the data transmitted to the BS 700.

In this embodiment of the present invention, the BS 700 sends the ACK message to the RS 702 or the MS 704 when the error-free data is received from the MS 704 via the RS 702. Alternatively, when receiving the ACK message from the RS 702 as in step 719, the BS 700 sends the ACK message to the MS 704. In this case, when the data received from the RS 702 has no error, the BS 700 sends the ACK message to the RS 702 or does not send the ACK message at all.

FIG. 8 illustrates an uplink signal retransmission method in the wireless relay communication system according to still another embodiment of the present invention. It is assumed that the data sent from the MS 704 to the RS 702 and the data sent from the RS 702 to the BS 700 have errors in FIG. 7.

In step 811 or 813, a BS 800 transmits the resource scheduling information for an MS 804 to send uplink data, to an RS 802 or the MS 804. For example, the BS 800 transmits the scheduling information to each of the RS 802 and the MS 804, or to the MS 804 via the RS 802.

Alternatively, the BS 800 can transmit the scheduling information only to the MS 804. The RS 802 can acquire the uplink scheduling information of the MS 804 by listening to the scheduling information transmitted from the BS 800 to the MS 804.

The RS 802 and the MS 804 confirm the time point of the data transmission and the resource information of the MS 804 using the scheduling information provided from the BS 800.

In step 815, the MS 804 transmits data to the RS 802 according to the scheduling information. If the MS 804 cannot recognize the RS 802, it may transmit the data to the BS 800. In this case, the RS 802 listens to and acquires the data transmitted from the MS 804 to the BS 800 according to the scheduling information.

In step 817, the RS 802 checks for errors in the data received from the MS 804. For example, the RS 802 checks the data for errors using the CRC of the data.

When the data received from the MS 802 has an error, the RS 802 sends the NACK message to the BS 800 according to the scheduling information provided from the BS 800 for the ACK/NACK message transmission in step 819. Herein, the BS 800 transmits the scheduling information for the ACK/NACK message transmission to the RS 802 according to the time point of the data transmission from the MS 804 to the RS 802.

Upon receiving the NACK message from the RS 802, the BS 800 sends the NACK message to the MS 804 to request the retransmission in step 821.

In step 823 or 825, the BS 800 transmits the scheduling information for the data retransmission of the MS 804 to the RS 802 or the MS 804. For example, the BS 800 transmits the scheduling information to each of the RS 802 and the MS 804, or to the MS 804 via the RS 802.

Alternatively, the BS 800 can transmit the scheduling information only to the MS 804. The RS 802 can acquire the uplink scheduling information of the MS 804 by listening to the scheduling information transmitted from the BS 800 to the MS 804.

The RS 802 and the MS 804 confirm the time point of the data retransmission and the resource information of the MS 804 using the scheduling information provided from the BS 800.

In step 827, the MS 804 retransmits the data to the RS 802 according to the scheduling information. If the MS 804 cannot recognize the RS 802, it can retransmit the data to the BS 800. In this situation, the RS 802 listens to and acquires the data retransmitted from the MS 804 to the BS 800 according to the scheduling information.

In step 829, the RS 802 checks for errors in the data retransmitted from the MS 804. For example, the RS 802 checks the data for errors using the CRC of the data.

When the data retransmitted from the MS 804 has no errors, the RS 802 sends the ACK message to the BS 800 according to the scheduling information, which is provided from the BS 800, for the ACK/NACK message transmission in step 831. Herein, the BS 800 transmits the scheduling information for the ACK/NACK message transmission to the RS 802 according to the time point of the data sent from the MS 804 to the RS 802.

Upon receiving the ACK message from the RS 802, the BS 800 transmits the scheduling information for the RS 802 to forward the data from the MS 804 to the BS 800, to the RS 802 in step 833.

In step 835, the RS 802 forwards the data retransmitted from the MS 804 to the BS 800 according to the scheduling information.

In step 837, the BS 800 checks for errors in the data retransmitted from the RS 802. For example, the BS 800 checks the data for errors using the CRC of the data.

When the data received from the RS 802 has an error, the BS 800 sends the NACK message and the scheduling information for the data retransmission of the RS 802 to the RS 802 in steps 839 and 841. Herein, the BS 800 can transmit only the scheduling information to the RS 802.

Upon receiving the NACK message, the RS 802 recognizes the error in the data transmitted to the BS 800 and checks the scheduling information for the data retransmission from the BS 800. Next, the RS 802 retransmits the data to the BS 800 according to the scheduling information in step 843.

In step 845, the BS 800 checks for errors in the data retransmitted from the RS 802. For instance, the BS 800 checks the data for errors using the CRC of the data.

When the data retransmitted from the RS 802 has no errors, the BS 800 sends the ACK message to the RS 802 or the MS 804 in step 847 or 849. For example, the BS 800 sends the ACK message to each of the RS 802 and the MS 804, or to the MS 804 via the RS 802.

Alternatively, the BS 800 can send the ACK message only to the MS 804. The RS 802 confirms that there are no errors in the data sent to the BS 800 by listening to the ACK message sent from the 800 to the MS 804. Also, when the NACK message or the scheduling information for the data retransmission is not received from the BS 800 over a certain time, the RS 802 regards as no error in the data sent to the BS 800.

In this embodiment of the present invention, receiving the error-free data from the MS 804 via the RS 802, the BS 800 sends the ACK message to the RS 802 or the MS 804. Alternatively, when receiving the ACK message from the RS 802 as in step 831, the BS 800 sends the ACK message to the MS 804. In this case, when the data received from the RS 802 has no errors, the BS 800 sends the ACK message to the RS 802 or does not send the ACK message at all.

Now, the operations of the BS and the RS for the uplink data retransmission of FIG. 7 or 8 are illustrated.

Figure 9:
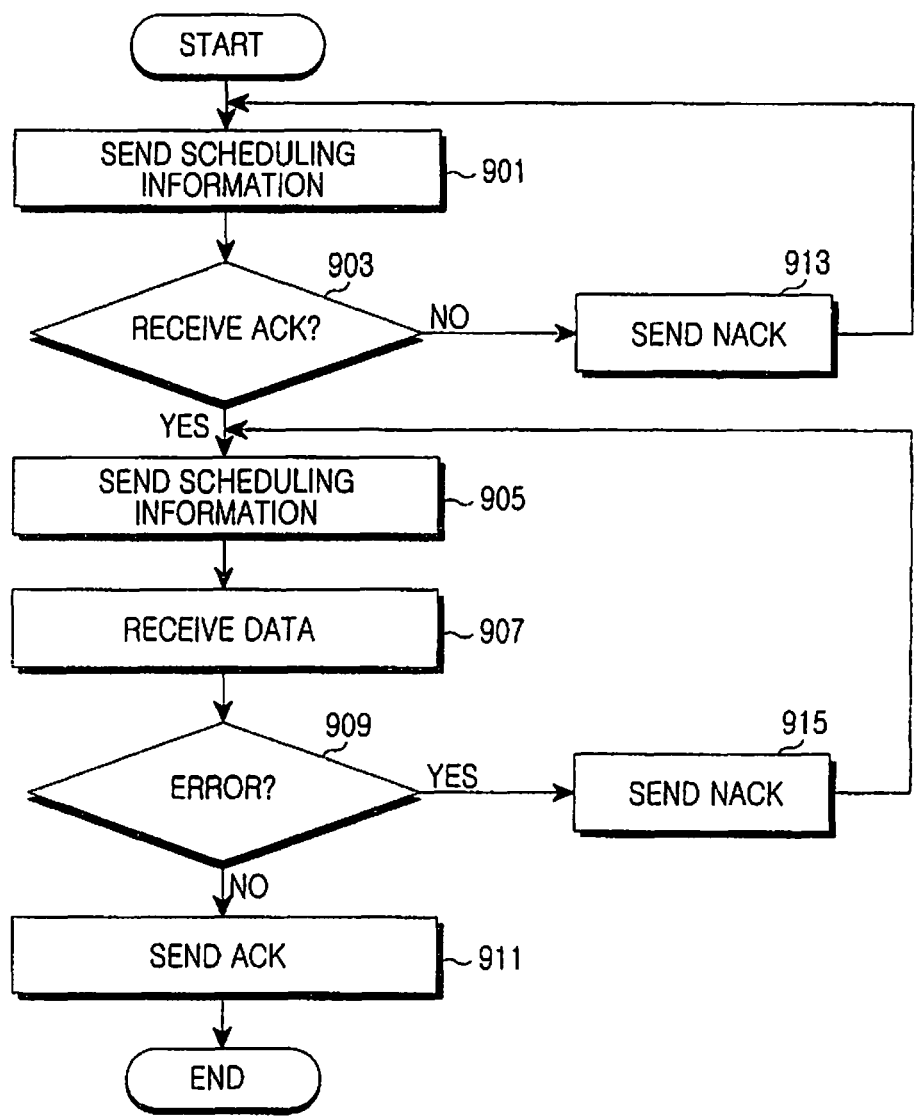
FIG. 9 is a flow diagram illustrating operations of a base station for retransmitting an uplink signal in the wireless relay communication system according to another embodiment of the present invention.

FIG. 9 illustrates the operations of the BS for retransmitting an uplink signal in the wireless relay communication system according to another embodiment of the present invention. It is assumed that the BS sends the ACK message to the RS or the MS when the uplink data received from the MS via the RS has no error.

In step 901, the BS transmits the resource scheduling information for the MS to send the uplink data, to the RS and the MS. For instance, the BS transmits the scheduling information of the MS to each of the RS and the MS, or to the MS via the RS. Alternatively, the BS transmits the scheduling information only to the MS. In this case, the RS can acquire the scheduling information of the MS by listening to the scheduling information sent from the BS to the MS.

Also, the BS transmits the scheduling information for the RS to send the ACK/NACK message, to the RS. The BS transmits the scheduling information for the uplink data transmission to the RS according to the time point of the data transmission from the MS to the RS.

Next, the BS checks whether the ACK message is received from the RS in step 903.

Upon receiving the NACK message rather than the ACK message, the BS sends the NACK message to the MS to request the data retransmission in step 913.

By contrast, upon receiving the ACK message, the BS transmits the scheduling information for the RS to forward the data from the MS, to the RS in step 905.

In step 907, the BS receives the data from the RS.

In step 909, the BS checks the data for errors. For example, the BS checks the data for errors using the CRC.

When the data has an error, the BS sends the NACK message to request the data retransmission in step 915. Next, the BS goes to step 905 and transmits the scheduling information for the RS to retransmit the data.

When the data is free from error, the BS sends the ACK message to the RS or the MS in step 911. For instance, the BS sends the ACK message to each of the RS and the MS, or to the MS via the RS. Alternatively, the BS can send the ACK message only to the MS. Next, the BS finishes this process.

As such, when the data has an error, the BS performs the retransmission process by requesting the data retransmission to the RS or the MS. When the retransmission lifetime expires, the BS finishes the retransmission process.

Figure 10:
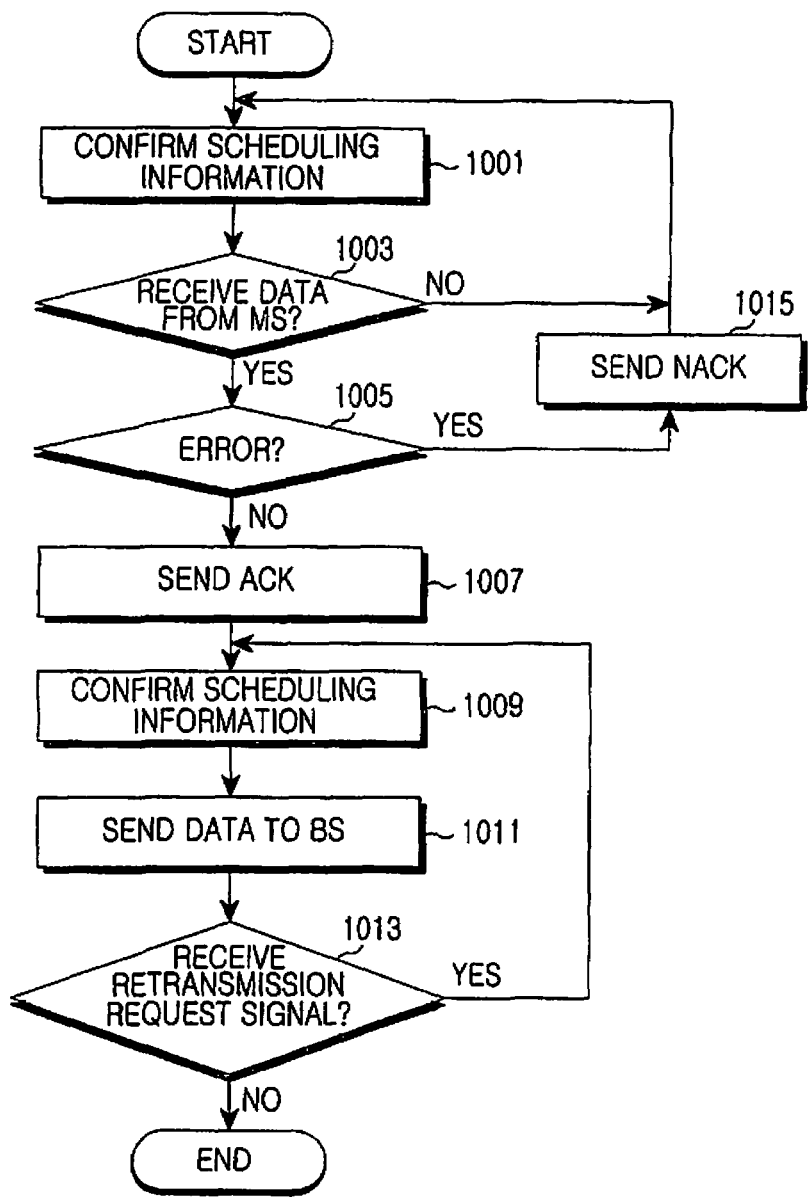
FIG. 10 is a flow diagram illustrating operations of a relay station for relaying the uplink signal in the wireless relay communication system according to another embodiment of the present invention.

FIG. 10 illustrates the operations of the RS for relaying the uplink signal in the wireless relay communication system according to another embodiment of the present invention.

In step 1001, the RS confirms the uplink scheduling information of the MS. For instance, the RS receives the uplink scheduling information of the MS from the BS. Alternatively, the RS acquires the scheduling information by listening to the uplink scheduling information sent from the BS to the MS.

In step 1003, the RS checks whether data is received from the MS according to the scheduling information.

When the data is not received over a certain time, the RS goes back to step 1001 and confirms the uplink scheduling information of the MS.

By contrast, when receiving the data from the MS according to the scheduling information, the RS checks for errors in the data received from the MS in step 1005. For example, the RS checks for errors in the data using the CRC.

When the data has an error, the RS sends the NACK message to the BS according to the scheduling information for the ACK/NACK message transmission, which is provided from the BS, in step 1015. Next, the RS returns to step 1001 and confirms the scheduling information for the data retransmission of the MS.

When the data has no errors in step 1005, the RS sends the ACK message to the BS according to the scheduling information for the ACK/NACK message transmission in step 1007.

In step 1009, the RS receives from the BS and confirms the scheduling information for the uplink data transmission.

In step 1011, the RS forwards the data received from the MS to the BS according to the scheduling information.

In step 1013, the RS checks whether the retransmission request signal is received from the BS. Herein, the retransmission request signal includes the NACK message.

When receiving the retransmission request signal from the BS, the RS goes back to step 1009 to receive from the BS and confirm the scheduling information for the data retransmission. For example, the RS, upon receiving the NACK message from the BS, recognizes the error in the data sent to the BS and receives the scheduling information for the data retransmission from the BS.

By contrast, when not receiving the retransmission request signal from the BS, the RS finishes this process. For example, the RS finishes this process when receiving the ACK message from the BS. The RS may receive the ACK message from the BS or listen to the ACK message sent from the BS to the MS. Alternatively, when the retransmission request signal is not received from the BS over a certain time, the RS regards the data sent to the BS as having no errors and thus finishes this process.

As above, the RS performs the data retransmission process according to the retransmission request of the BS. In doing so, when the retransmission lifetime expires, the RS finishes the retransmission process.

Figure 11:
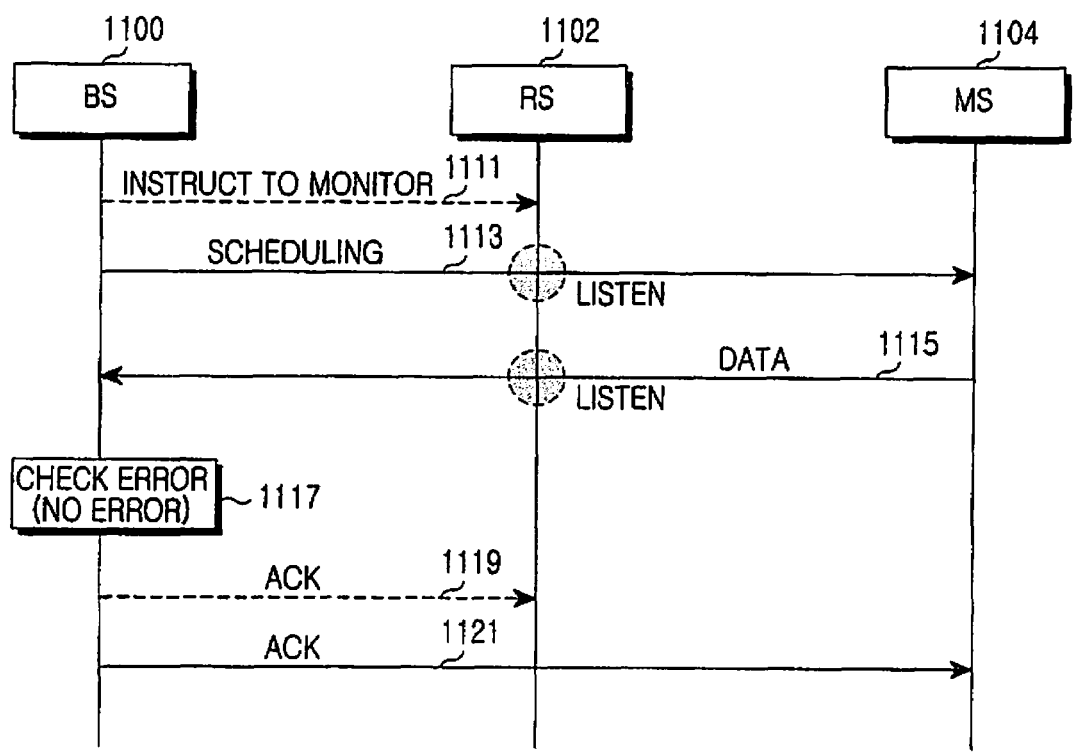
FIG. 11 is a diagram illustrating an uplink signal retransmission method in the wireless relay communication system according to a further embodiment of the present invention.
Figure 12:
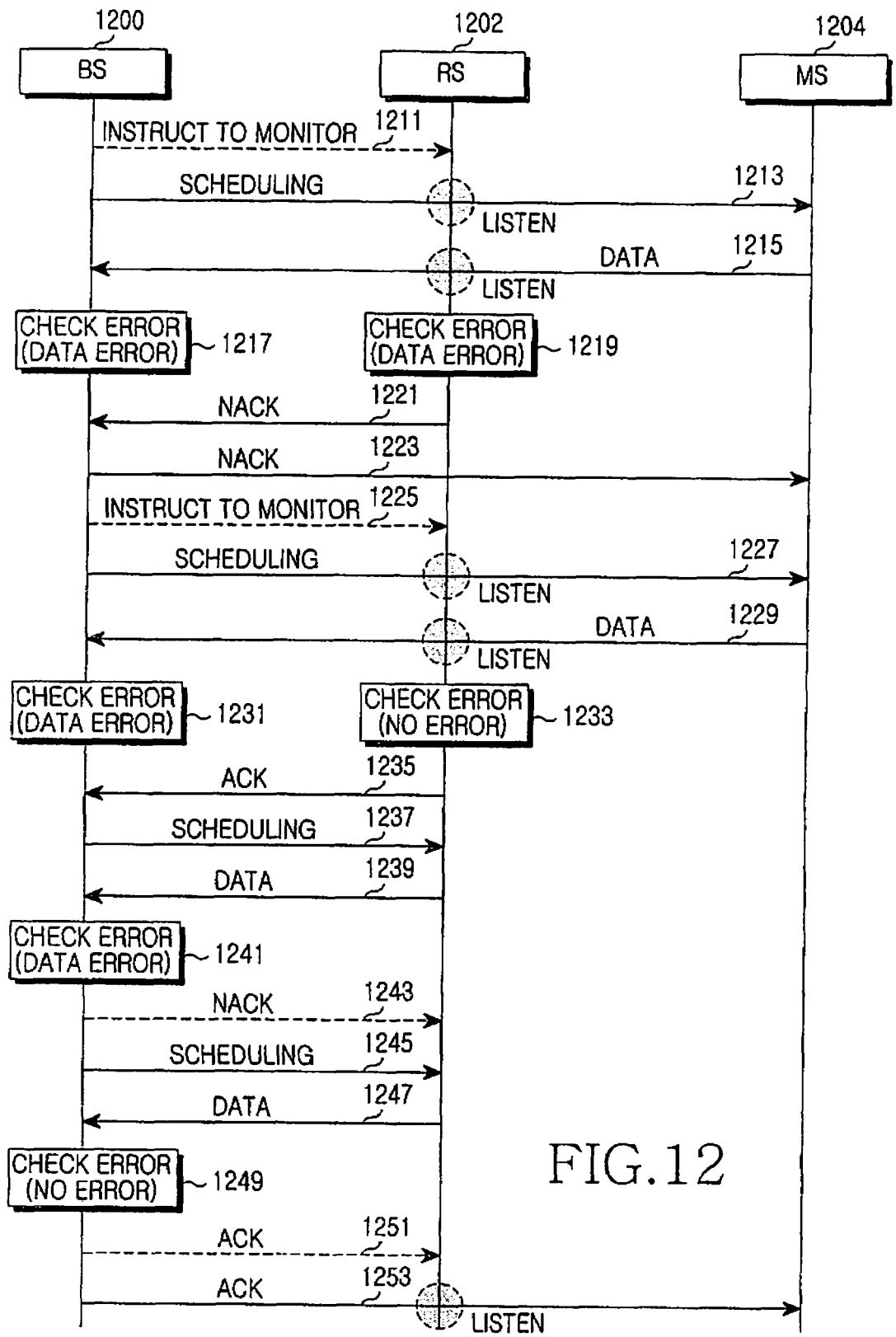
FIG. 12 is a diagram illustrating an uplink signal retransmission method in the wireless relay communication system according to another embodiment of the present invention.

Now, descriptions provide how the wireless communication system selectively receives the retransmitted data from the RS or the MS when the BS of the wireless communication system receives data directly from the MS without the RS as shown in FIG. 11 or 12.

FIG. 11 illustrates an uplink signal retransmission method in the wireless relay communication system according to another embodiment of the present invention.

In step 1113, a BS 1100 transmits resource scheduling information for an MS 1104 to send uplink data, to the MS 1104. An RS 1102 can acquire the uplink scheduling information of the MS 1104 by listening to the scheduling information sent from the BS 1100 to the MS 1104.

Alternatively, the BS 1100 transmits monitoring information including an ID of the MS 1104 to the RS 1102 so that the RS 1102 can confirm the uplink data received from the MS 1104 in step 1111.

In doing so, the RS 1102 confirms time point of the data transmission and resource information of the MS 1104 from the scheduling information or the monitoring information received from the BS 1100.

In step 1115, the MS 1104 transmits data to the BS 1100 according to the scheduling information. The RS 1102 listens to and confirms the data sent from the MS 1104 to the BS 1100 according to the scheduling information or the monitoring information.

The RS 1102 checks for errors in the listened data. When the data has no errors, the RS 1102 temporarily stores the data and sends an ACK message to the BS 1100. By contrast, when the listened data has an error, the RS 1102 sends a NACK message to the BS 1100. At this time, the RS 1102 sends the ACK message or the NACK message to the BS 1100 according to the scheduling information, which is provided from the BS 1100, for sending the ACK/NACK message.

In step 1117, the BS 1100 checks for errors in the data received from the MS 1104. For example, the BS 1100 checks the data for errors using the CRC of the data.

When the data from the MS 1104 has no errors, the BS 1100 sends an ACK message to the RS 1102 or the MS 1104 in step 1119 or 1121. For instance, the BS 1100 sends the ACK message to each of the RS 1102 and the MS 1104, or to the MS 1104 via the RS 1102.

Alternatively, the BS 1100 can send the ACK message only to the MS 1104. The RS 1102 confirms there are no errors in the data sent to the BS 1100 by listening to the ACK message transmitted from the BS 1100 to the MS 1104.

When the NACK message or the scheduling information for the data retransmission is not received from the BS 110 over a certain time, the RS 1102 regards the data sent to the BS 1100 as having no errors.

FIG. 12 illustrates an uplink signal retransmission method in the wireless relay communication system according to another embodiment of the present invention. It is assumed that the data sent from the MS 1104 to the RS 1102 and the data sent from the RS 1102 to the BS 1100 in FIG. 11 have errors.

In step 1213, a BS 1200 transmits the resource scheduling information for an MS 1204 to send uplink data, to the MS 1204. An RS 1202 can acquire the uplink scheduling information of the MS 1204 by listening to the scheduling information sent from the BS 1200 to the MS 1204, which communicates with the RS 1202.

Alternatively, the BS 1200 transmits monitoring information including the ID of the MS 1204 to the RS 1202 so that the RS 1202 can confirm the uplink data sent from the MS 1204 in step 1211.

In this case, the RS 1202 confirms time point of the data transmission and resource information of the MS 1204 from the scheduling information or the monitoring information.

In step 1215, the MS 1204 transmits data to the BS 1200 according to the scheduling information. The RS 1202 listens to and acquires the data sent from the MS 1204 to the BS 1200 according to the scheduling information or the monitoring information.

In steps 1217 and 1219, the BS 1200 and the RS 1202 check for errors in the data received from the MS 1204. When the data received from the MS 1204 has no errors, the RS 1202 temporarily stores the data and sends an ACK message to the BS 1200. When the data received from the MS 1204 has an error, the RS 1202 sends a NACK message to the BS 1200. Herein, the RS 1202 sends the ACK or NACK message to the BS 1200 according to the scheduling information, which is provided from the BS 1200, for the ACK/NACK transmission.

Provided that the data received at the RS 1202 has an error, the RS 1202 sends the NACK message to the BS 1200 in step 1221.

Provided that the data received at the BS 1200 has an error, the BS 1200 checks the ACK/NACK message received from the RS 1202. In doing so, when receiving the NACK message from the RS 1202, the BS 1200 sends a NACK message to the MS 1204 to request the data retransmission in step 1223.

In step 1227, the BS 1200 transmits resource scheduling information for the MS 1204 to retransmit the uplink data, to the MS 1204. The RS 1202 can acquire the uplink scheduling information of the MS 1204 by listening to the scheduling information sent from the BS 1200 to the MS 1204, which communicates with the RS 1202.

If the BS 1200 transmits the monitoring information to the RS 1202 in step 1225, the RS 1202 can confirm the time point and the resource of the data retransmission from the MS 1204 according to the monitoring information.

In step 1229, the MS 1204, upon confirming the scheduling information from the BS 1200, retransmits the data to the BS 1200 according to the scheduling information. The RS 1202 listens to and acquires the data sent from the MS 1204 to the BS 1200 according to the scheduling information or the monitoring information.

In steps 1231 and 1233, the BS 1200 and the RS 1202 check for errors in the data received from the MS 1204. When the data has no errors, the RS 1202 temporarily stores the data and sends an ACK message to the BS 1200. When the data has an error, the RS 1202 sends a NACK message to the BS 1200. The RS 1202 sends the ACK or NACK message to the BS 1200 according to the scheduling information, which is provided from the BS 1200, for the ACK/NACK message transmission.

Provided that the data received at the RS 1202 is free from errors, the RS 1202 sends an ACK message to the BS 1200 in step 1235.

When the data received at the BS 1200 has an error, the BS 1200 checks whether the ACK or NACK message is received from the RS 1202.

When receiving the ACK message from the RS 1202, the BS 1200 determines a node for retransmitting the data among the RS 1202 and the MS 1204. For example, the BS 1200 determines the node for retransmitting the data by taking into account channel information of the RS 1202 and channel information of the MS 1204.

When the RS 1202 is selected as the node for retransmitting the data, the BS 1200 transmits scheduling information for the RS 1202 to send the listened data from the MS 1204, to the RS 1202 in step 1237.

In step 1239, the RS 1202 sends the data listened from the MS 1204 to the BS 1200 using the scheduling information.

In step 1241, the BS 1200 checks for errors in the data retransmitted from the RS 1202. For example, the BS 1200 checks the data error using the CRC of the data.

When the data has an error, the BS 1200 transmits a NACK message and scheduling information for the RS 1202 to retransmit the data, to the RS 1202 in steps 1243 and 1245. The BS 1200 can transmit merely the scheduling information to the RS 1202.

Receiving the NACK message, the RS 1202 recognizes the error in the data sent to the BS 1200 and retransmits the data to the BS 1200 according to the scheduling information in step 1247.

In step 1249, the BS 1200 checks for errors in the data retransmitted from the RS 1202. For example, the BS 1200 checks the data error using the CRC of the data.

When the data has no errors, the BS 1200 sends an ACK message to the RS 1202 or the MS 1204 in step 1251 or 1253. For instance, the BS 1200 sends the ACK message to each of the RS 1202 and the MS 1204, or to the MS 1204 via the RS 1202.

Alternatively, the BS 1200 can send the ACK message only to the MS 1204. The RS 102 listens to the ACK message sent from the BS 1200 to the MS 1204 and confirms that there are no errors in the data transmitted to the BS 1200. When the NACK message or the scheduling information for the data retransmission is not received from the BS 1200 over a certain time, the RS 1202 regards the data transmitted to the BS 1200 as having no errors.

In this embodiment of the present invention, when receiving the error-free uplink data of the MS 1204 via the RS 1202, the BS 1200 sends the ACK message to the RS 1202 or the MS 1204. Alternatively, when receiving the ACK message from the RS 1202 as in step 1235, the BS 1200 sends the ACK message to the MS 1204. In this case, when the data received from the RS 1202 has no error, the BS 1200 sends the ACK message to the RS 1202 or does not send the ACK message at all.

Figure 13:
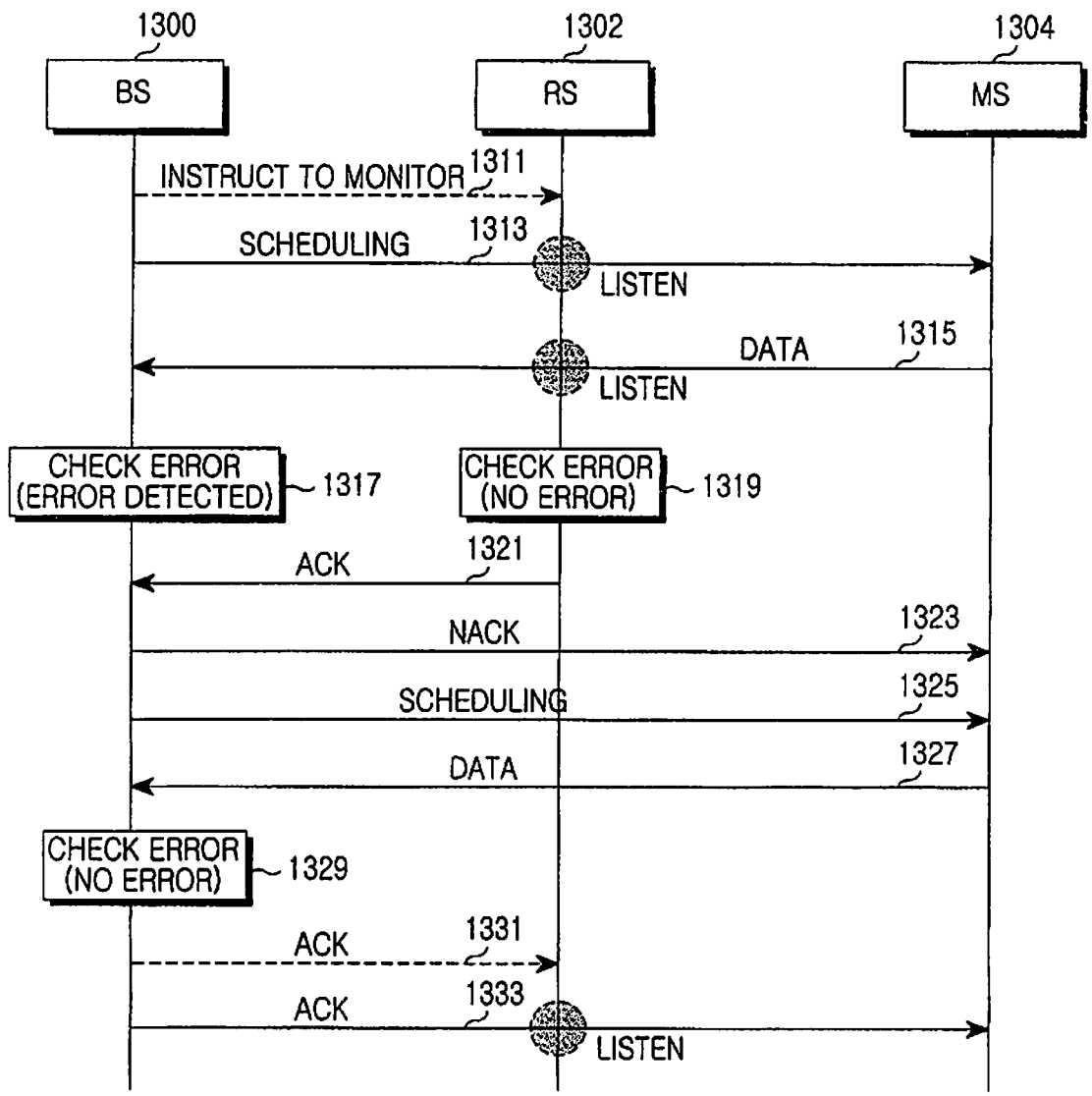
FIG. 13 is a diagram illustrating an uplink signal retransmission method in the wireless relay communication system according to a further embodiment of the present invention.

When the BS selects the MS as the node for requesting the retransmission of the data, the wireless communication system performs the retransmission process as shown in FIG. 13.

FIG. 13 illustrates an uplink signal retransmission method in the wireless relay communication system according to another embodiment of the present invention.

A BS 1300 transmits resource scheduling information for an MS 1304 to send uplink data, to the MS 1304 in step 1313. An RS 1302 can acquire the uplink scheduling information of the MS 1304 by listening to the scheduling information sent from the BS 1300 to the MS 1304.

Alternatively, the BS 1300 transmits monitoring information including an ID of the MS 1304 to the RS 1302 so that the RS 1302 can confirm the uplink data transmitted from the MS 1304 in step 1311.

The RS 1302 confirms time point and resource information of the data transmission of the MS 1304 from the scheduling information or the monitoring information.

In step 1315, after confirming the scheduling information, the MS 1304 transmits data to the BS 1300 according to the scheduling information. The RS 1302 listens to and confirms the data sent from the MS 1304 to the BS 1300 according to the scheduling information or the monitoring information.

In steps 1317 and 1319, the BS 1300 and the RS 1302 check for errors in the data received from the MS 1304. When the data has no errors, the RS 1302 temporarily stores the data and sends an ACK message to the BS 1300. When the data has an error, the RS 1302 sends a NACK message to the BS 1300. The RS 1302 sends the ACK or NACK message to the BS 1300 according to the scheduling information, which is provided from the BS 1300, for the ACK/NACK message transmission.

Provided that the data received at the RS 1302 has no errors, the RS 1302 sends an ACK message to the BS 1300 in step 1321.

Provided that the data received at the BS 1300 has an error, the BS 1300 selects a node for requesting the data retransmission (e.g., RS 1302 or MS 1304). For example, the BS 1300 selects the node for requesting the data retransmission by checking the channel conditions of the RS 1302 and the MS 1304.

Provided that the MS 1304 is the node for retransmitting the data to the BS 1300, the BS 1300 sends the NACK message to the MS 1304 to request the data retransmission even when the ACK message is received from the RS 1302 in step 1323.

In step 1325, the BS 1300 transmits resource scheduling information for the MS 1304 to retransmit the uplink data, to the MS 1304.

After confirming the scheduling information, the MS 1304 retransmits the data to the BS 1300 according to the scheduling information in step 1327.

In step 1329, the BS 1300 checks for errors in the data received from the MS 1304. For example, the BS 1300 checks the data for errors using the CRC of the data.

When the data has no errors, the BS 1300 sends an ACK message to the RS 1302 or the MS 1304 in step 1331 or 1333. For instance, the BS 1300 sends the ACK message to each of the RS 1302 and the MS 1304.

The BS 1300 can send the ACK message only to the MS 1304. The RS 1302 confirms that there are no errors in the data sent to the BS 1300 by listening to the ACK message sent from the BS 1300 to the MS 1304. When the NACK message or the scheduling information for the data retransmission is not received from the BS 1300 over a certain time, the BS 1302 regards the data sent to the BS 1300 as having no errors.

Now, the operations of the BS and the RS for performing the uplink data retransmission of FIG. 11, 12, or 13 are explained.

Figure 14:
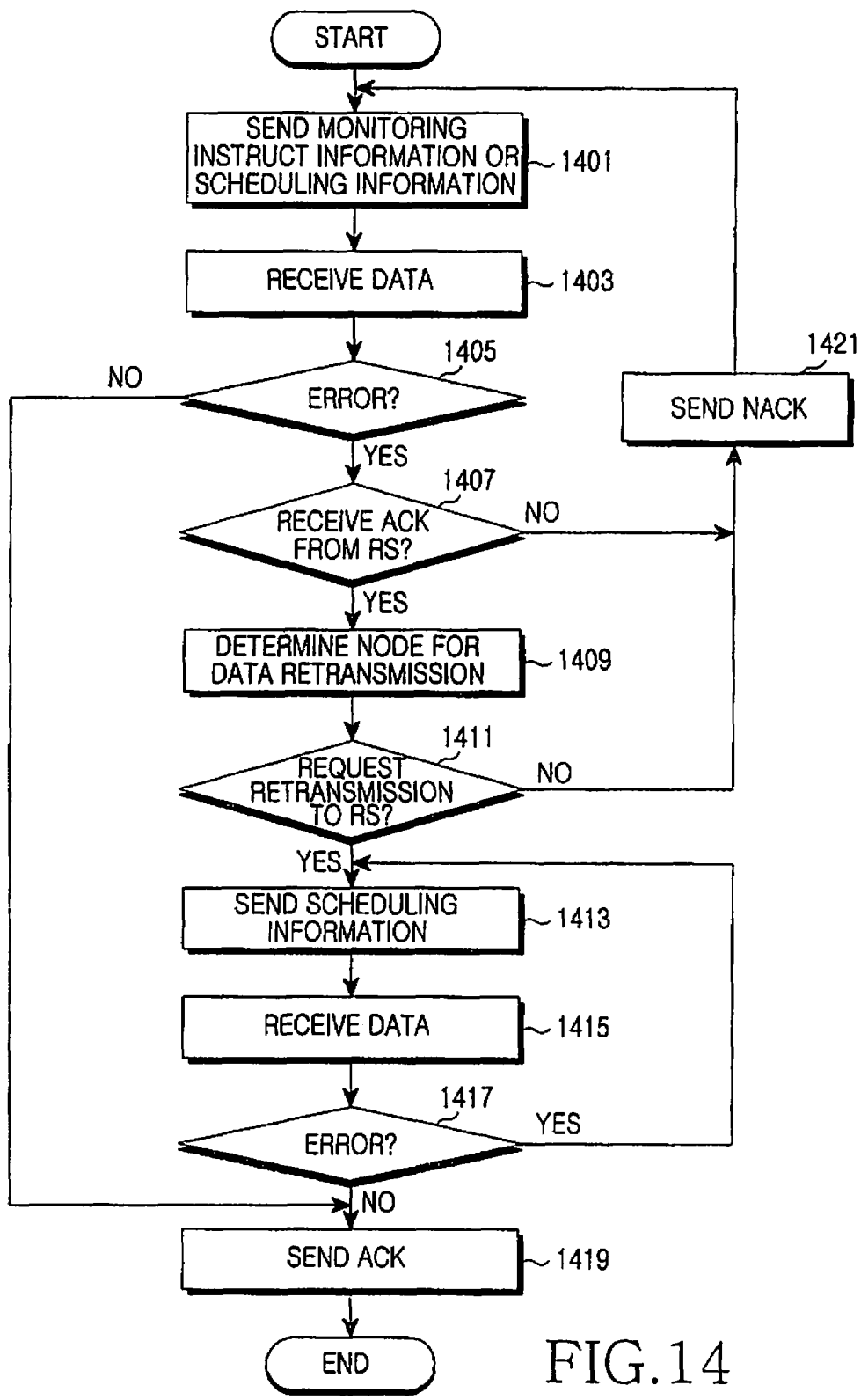
FIG. 14 is a flow diagram illustrating operations of a base station for retransmitting the uplink signal in the wireless relay communication system according to a further embodiment of the present invention.

FIG. 14 illustrates the operations of the BS for retransmitting the uplink signal in the wireless relay communication system according to further embodiment of the present invention.

In step 1401, the BS transmits the scheduling information for the MS to send the uplink data, to the MS. The BS also transmits the monitoring information including the ID information of the MS to the RS to confirm the uplink data of the MS. If the RS listens to the scheduling information sent from the BS to the MS, the BS needs not to transmit the monitoring information to the RS.

In step 1403, the BS receives the data from the MS.

In step 1405, the BS checks for errors in the data. For example, the BS checks the data for errors using the CRC.

When the data has no errors, the BS goes to step 1419 and sends the ACK message to the RS and the MS. The BS can send the ACK message to each of the RS and the MS, or only to the MS.

By contrast, when the data has an error, the BS checks whether the ACK message is received from the RS in step 1407.

When receiving the NACK message from the RS, the BS sends the NACK message to request the data retransmission to the MS in step 1421.

When receiving the ACK message from the RS, the BS determines the node (e.g., RS or MS) for the data retransmission request in step 1409. Herein, the BS determines the node for the data retransmission request by taking into account the channel conditions of the RS and the MS.

In step 1411, the BS checks whether the RS is selected as the node for the retransmission request.

When the MS is selected as the retransmission request node, the BS goes to step 1421 and sends the NACK message indicative of the data error to the MS.

Next, the BS returns to step 1401 and transmits the scheduling information for the uplink data retransmission of the MS, to the MS.

By contrast, when the RS is selected as the retransmission request node, the BS transmits the scheduling information for the RS to forward the data listened from the MS, to the RS in step 1413.

In step 1415, the BS receives the data from the RS.

In step 1417, the BS checks for errors in the data. For example, the BS checks the data error using the CRC.

When the data has an error, the BS goes back to step 1413 and transmits the scheduling information for the data retransmission to the RS. Alternatively, the BS transmits the NACK message indicative of the data error to the RS, which is not shown. Next, the BS returns to step 1413 and transmits the scheduling information to the RS.

When the data is free from errors, the BS sends the ACK message to the RS or the MS in step 1419. The BS can send the ACK message to each of the RS and the MS, or only to the MS. Next, the BS finishes this process.

As mentioned above, when the data has an error, the BS performs the retransmission process by requesting the data retransmission to the RS or the MS. When the retransmission lifetime expires, the BS finishes the retransmission process.

Figure 15:
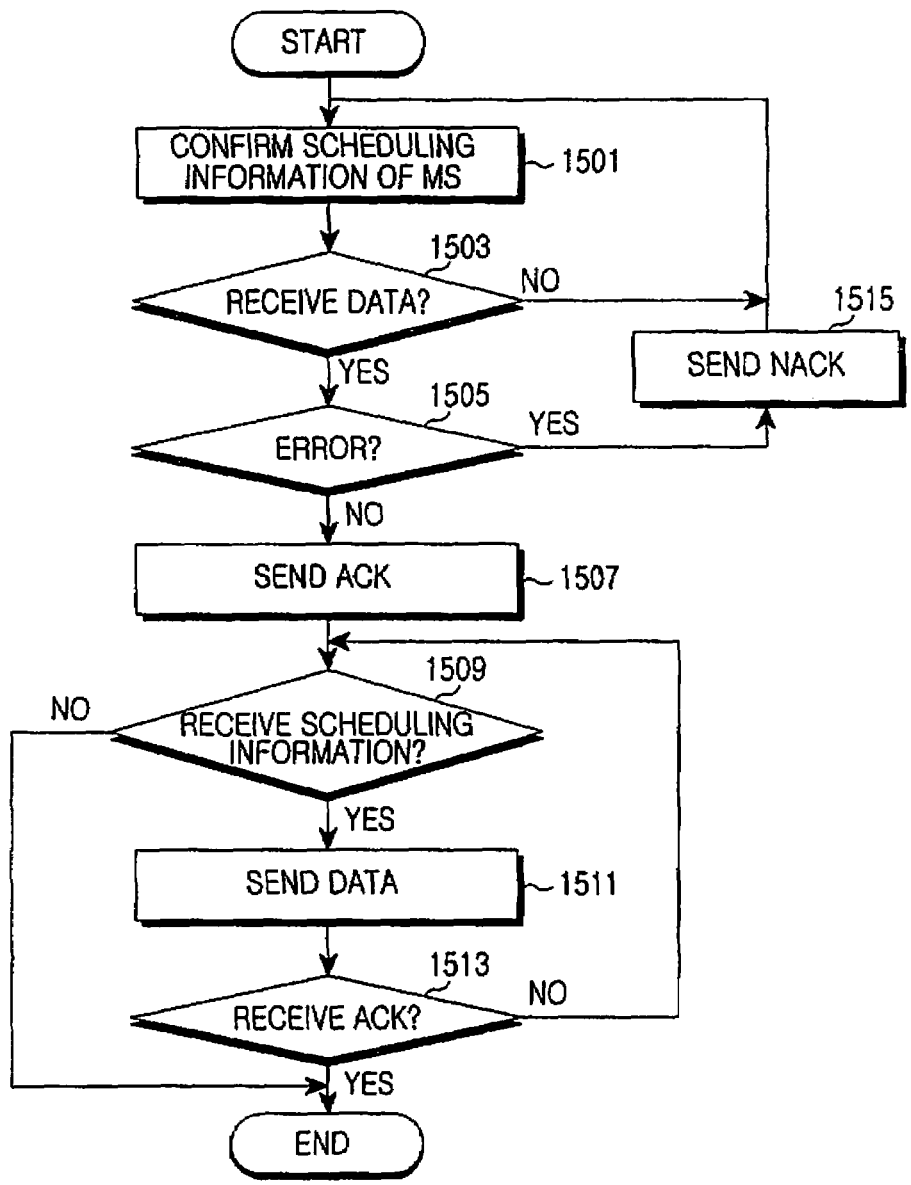
FIG. 15 is a flow diagram illustrating operations of a relay station for relaying the uplink signal in the wireless relay communication system according to a further embodiment of the present invention.

FIG. 15 illustrates the operations of the RS for relaying the uplink signal in the wireless relay communication system according to another embodiment of the present invention.

In step 1501, the RS confirms the uplink scheduling information of the MS. For instance, the RS acquires the scheduling information by listening to the uplink scheduling information sent from the BS to the MS communicating with the RS. Alternatively, the RS confirms the scheduling information for the uplink data transmission of the MS based on the monitoring information provided from the BS.

In step 1503, the RS checks whether the data is received from the MS using the scheduling information.

When no data is received over a certain time, the RS goes back to step 1501 and confirms the uplink scheduling information of the MS.

Upon receiving the data, the RS checks for errors in the data in step 1505. For example, the RS checks the data for errors using the CRC.

When the data has an error, the RS sends the NACK message to the BS according to the scheduling information, which is provided from the BS, for the ACK/NACK message transmission in step 1515. Next, the RS goes to step 1501 and confirms the uplink scheduling information of the MS.

By contrast, when the data is free from errors in step 1505, the RS sends the ACK message to the BS according to the scheduling information for the ACK/NACK message transmission in step 1507.

In step 1509, the RS checks whether the scheduling information for the uplink data transmission is received from the BS.

When receiving the scheduling information, the RS transmits the data to the BS according to the scheduling information in step 1511.

In step 1513, the RS checks whether the ACK message is received from the BS.

When the NACK message, rather than the ACK message, is received, the RS goes back to step 1509 and checks whether the scheduling information for the data retransmission is received from the BS.

When the ACK message is received, the RS finishes this process. For instance, the RS can receive the ACK message from the BS or listen to the ACK message sent from the BS to the MS communicating with the RS. Alternatively, when no retransmission request signal is received from the BS over a certain time, the RS regards the data transmitted to the BS as having no error and accordingly finishes this process.

As described above, the RS performs the data retransmission process according to the retransmission request of the BS. When the retransmission lifetime expires, the RS finishes the retransmission process.

Now, the structures of the BS, the RS, and the MS for performing the data retransmission in the wireless communication system are explained. Herein, since the BS, the RS, and the MS have the same structure, only the structure of the RS is illustrated based on FIG. 16 and the descriptions on the BS and the MS shall be omitted.

Figure 16:
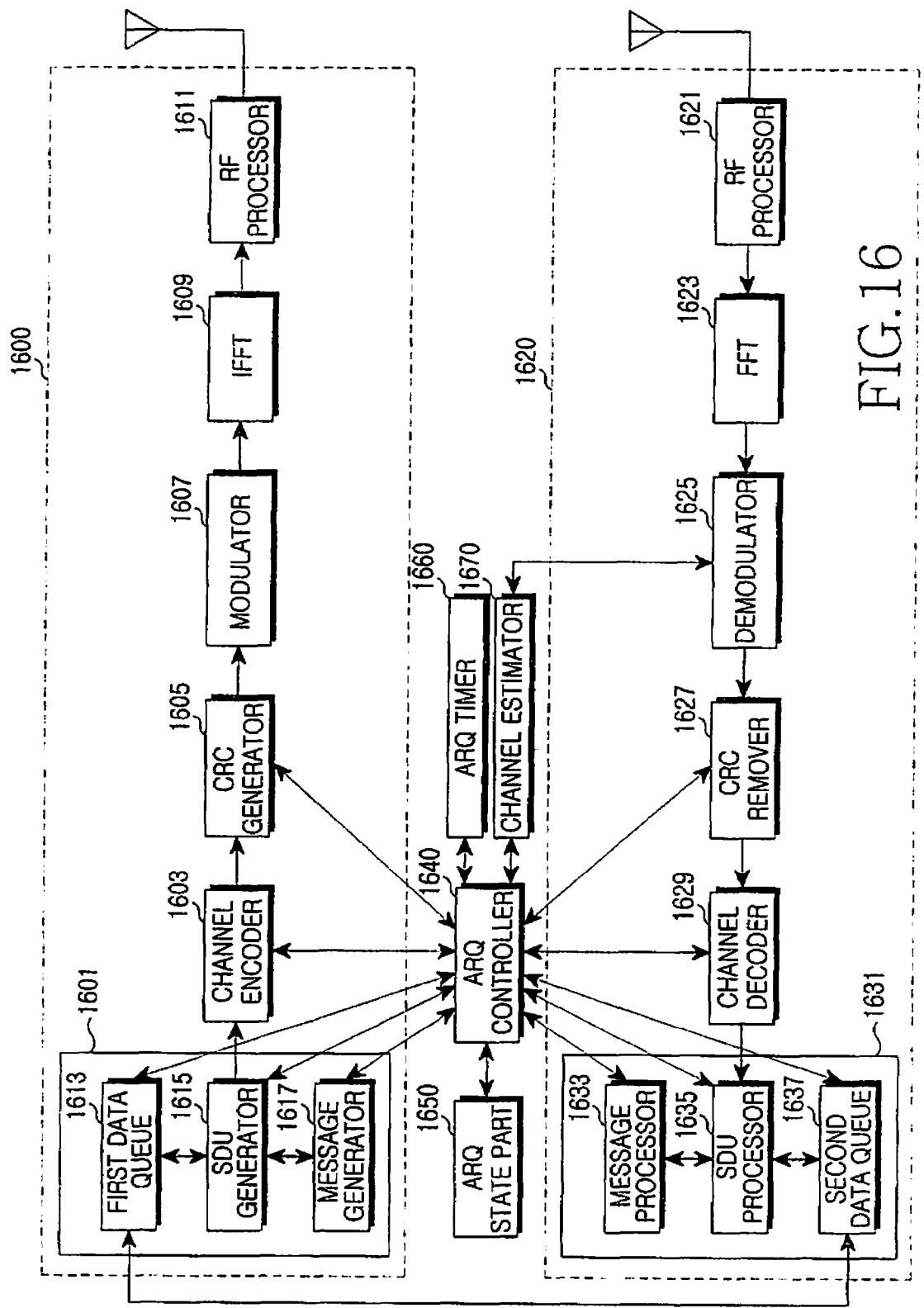
FIG. 16 is a diagram illustrating a structure of the relay station in the wireless relay communication system according to an embodiment of the present invention.

FIG. 16 is the block diagram of the RS in the wireless relay communication system according to an embodiment of the present invention. While it is assumed that a sender 1600 and a receiver 1620 use different antennas, they may use a singe antenna.

The RS of FIG. 16 includes the sender 1600, the receiver 1620, an ARQ controller 1640, an ARQ state part 1650, an ARQ timer 1660, and a channel estimator 1670. The sender 1600 and the receiver 1620 share the ARQ controller 1640, the ARQ state part 1650, the ARQ timer 1660, and the channel estimator 1670.

The sender 1600 includes a data generator 1601, a channel encoder 1603, a CRC generator 1605, a modulator 1607, an Inverse Fast Fourier Transform (IFFT) operator 1609, and a Radio Frequency (RF) processor 1611.

The data generator 1601 gathers data stored to a data queue 1613 and a control message generated at a message generator 1617 in a Service Data Unit (SDU) generator 1615 and generates one data for the physical layer transmission. Herein, the message generator 1617 generates an ACK control message when the data received through the receiver 1620 is free from errors. By contrast, when the data has an error, the message generator 1617 generates an NACK message.

The channel encoder 1603 encodes the data provided from the data generator 1601 at a corresponding modulation level (e.g., Modulation and Coding Scheme (MCS) level). The CRC generator 1605 generates and adds the CRC to the data output from the channel encoder 1603.

The modulator 1607 modulates the data output from the CRC generator 1605 at the corresponding modulation level (e.g., MCS level).

The IFFT operator 1609 converts the frequency-domain data output from the modulator 1607 to a time-domain signal through the IFFT process.

The RF operator 1611 up-converts the baseband signal output from the IFFT operator 1609 to an RF signal and outputs the RF signal to the BS or the MS over an antenna.

The receiver 1620 includes an RF processor 1621, an FFT operator 1623, a demodulator 1625, a CRC remover 1627, a channel decoder 1629, and a data processor 1631.

The RF processor 1621 down-converts the RF signal received from the BS or the MS over an antenna to a baseband signal.

The FFT operator 1623 converts the time-domain signal output from the RF processor 1621 to a frequency-domain signal through the FFT process.

The demodulator 1625 demodulates the signal output from the FFT operator 1623 at the corresponding modulation level. The demodulator 1625 outputs the demodulated signal to the CRC remover 1627 and the channel estimator 1670.

The CRC remover 1627 determines whether error occurs in the signal by checking the CRC of the signal output from the demodulator 1625. The CRC remover 1627 removes the CRC from the signal output from the demodulator 1625.

The channel decoder 1629 decodes the error-free signal output from the CRC remover 1627 at the corresponding modulation level.

An SDU processor 1635 of the data processor 1631 separates the data and the control message from the physical layer signal output from the channel decoder 1629. The SDU processor 1635 provides the data to a second data queue 1637 to store it, and provides the control message to a message processor 1633 to decode it. Herein, the first data queue 1613 and the second data queue 1627 may be the same data queue. When the NACK control message is received from the BS, the message processor 1633 informs the ARQ controller 1640 of the NACK control message reception.

The ARQ state part 1650 manages the ARQ condition with respect to the retransmitted data. The ARQ timer 1660 manages the retransmission lifetime of the RS.

The ARQ controller 1640 controls the overall ARQ operation of the RS in association with the ARQ state part 1650 and the ARQ timer 1660. The ARQ controller 1640 controls the retransmission while communicating with the data generator 1601, the channel encoder 1603, and the CRC generator 1605 of the sender 1600. For example, upon receiving the retransmission request from the BS through the receiver 1620, the ARQ controller 1640 controls to encode the data received from the MS and stored to the data queue 1613 according to the channel condition, to insert the CRC, and to retransmit the data to the BS.

Also, the ARQ controller 1640 controls the retransmission while communicating with the data processor 1631, the channel decoder 1629, and the CRC remover 1627 of the receiver 1620. For example, when the data has an error at the CRC remover 1627, the ARQ controller 1640 controls the message generator 1617 to generate the NACK control message to be sent to the BS.

When receiving the lifetime expire message from the ARQ timer 1660 in the process of the retransmission, the ARQ controller 1640 finishes the retransmission process.

While the wireless communication system provides the relay service using the single RS by way of example, a multihop relay wireless communication system can perform substantially the same operations.

As set forth above, the wireless relay communication system carries out the ARQ for the uplink signal using the RS. Therefore, the RS can retransmit the error-free data to the BS and the BS can enhance the data reliability.

While the invention has been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. A retransmission method of a Base Station (BS) in a wireless relay communication system, the method comprising the steps of:
   checking whether an Acknowledgement (ACK) message or a Negative ACK (NACK) message for data is received from a Relay Station (RS), which receives the data from a Mobile Station (MS);
   transmitting scheduling information for transmitting the data to the RS, when the ACK message is received from the RS;
   checking for errors in the data, when the data is received from the RS; and
   requesting the RS to retransmit the data, when the data has an error.

2. The retransmission method of claim 1, further comprising:
   transmitting scheduling information for the MS to send data, to at least one node of the MS and the RS; and
   transmitting ACK/NACK message scheduling information for the RS to send an ACK message or a NACK message of the data received from the MS, to the RS;
   wherein it is checked whether the ACK message or the NACK message is received from the RS according to the ACK/NACK message scheduling information.

3. The retransmission method of claim 1, further comprising:
   transmitting an ACK message to the MS, when the ACK message is received from the RS.

4. The retransmission method of claim 1, further comprising:
   requesting the data retransmission to the MS, when the NACK message is received from the RS.

5. The retransmission method of claim 4, wherein requesting retransmission to the MS comprises:
   transmitting a NACK message to the MS.

6. The retransmission method of claim 1, wherein requesting retransmission to the RS comprises:
   transmitting a NACK message to the RS; and
   transmitting scheduling information for the data retransmission to the RS.

7. The retransmission method of claim 1, wherein requesting retransmission to the RS comprises:
   transmitting scheduling information for the data retransmission to the RS.

8. The retransmission method of claim 1, further comprising:
transmitting an ACK message to at least one node of the RS and the MS, when the data received from the RS has no errors.

9. The retransmission method of claim 1, further comprising:
checking a lifetime for the retransmission when the data is retransmitted; and
finishing the data retransmission when the lifetime expires.

10. The retransmission method of claim 1, further comprising:
comparing signal reception rates of the MS and the RS,
wherein it is checked whether the ACK message or the NACK message is received from the RS with respect to the data sent from the MS to the RS, when the signal reception rate of the RS is higher.

11. A retransmission method of a Relay Station (RS) in a wireless relay communication system, the method comprising the steps of:
receiving data from a Mobile Station (MS) using scheduling information for the MS to transmit data;
checking for errors in the received data;
transmitting an Acknowledgement (ACK) message to a Base Station (BS) when the data has no errors;
receiving scheduling information for forwarding the data, from the BS;
forwarding the data to the BS using the received scheduling information; and
retransmitting the data to the BS, when a retransmission request signal is received from the BS.

12. The retransmission method of claim 11, wherein receiving data comprises:
identifying scheduling information for the MS to send data; and
receiving data from the MS using the scheduling information.

13. The retransmission method of claim 12, wherein identifying scheduling information comprises:
identifying scheduling information for the MS to send data comprising the information provided from the BS.

14. The retransmission method of claim 12, wherein identifying scheduling information comprises:
acquiring the scheduling information by listening to the scheduling information, which is sent from the BS to the MS, for the data transmission of the MS.

15. The retransmission method of claim 11, further comprising:
identifying ACK/Negative ACK (NACK) message scheduling information, which is received from the BS, for sending an ACK message or a NACK message in relation with the data received from the MS,
wherein an ACK message is transmitted to the BS according to the ACK/NACK message scheduling information, when the data received from the MS has no errors.

16. The retransmission method of claim 15, further comprising:
transmitting a NACK message to the BS according to the ACK/NACK message scheduling information, when the data received from the MS has an error.

17. The retransmission method of claim 11, wherein the data retransmitting comprises:
identifying scheduling information, which is received from the BS, for the data retransmission, when the NACK message is received from the BS; and
retransmitting the data to the BS according to the scheduling information.

18. The retransmission method of claim 11, wherein retransmitting the data comprises:
retransmitting the data to the BS according to the scheduling information, when scheduling information is received for the data retransmission from the BS.

19. The retransmission method of claim 11, further comprising:
checking a lifetime for the retransmission when the data is retransmitted; and
finishing the data retransmission when the lifetime expires.

20. A retransmission method of a Base Station (BS) in a wireless relay communication system, the method comprising the steps of:
checking for errors in data, when the data is received from a Mobile Station (MS);
checking whether an Acknowledgement (ACK) message or a Negative ACK (NACK) message is received with respect to data sent from the MS to a Relay Station (RS), when the data has an error;
determining a node for data retransmission, when receiving an ACK message from the RS; and
requesting the data retransmission to the RS, when the RS is selected as the node for the retransmission.

21. The retransmission method of claim 20, further comprising:
transmitting scheduling information for the MS to send data, to at least one node of the MS and the RS,
wherein data is received from the MS using the scheduling information.

22. The retransmission method of claim 20, wherein checking whether the ACK message or the NACK message is received comprises:
transmitting ACK/NACK message scheduling information for the RS to send an ACK message or a NACK message in relation to the data received from the MS, to the RS; and
checking whether the ACK message or the NACK message is received from the RS according to the ACK/NACK message scheduling information.

23. The retransmission method of claim 20, further comprising:
transmitting an ACK message to at least one node of the RS and the MS, when the data received from the MS has no errors.

24. The retransmission method of claim 20, wherein determining a node for the data retransmission comprises:
determining a node of better channel condition information as the node for the data retransmission by comparing channel condition information of the RS and the MS.

25. The retransmission method of claim 20, further comprising:
transmitting an ACK message to the MS, when the RS is selected as the node for the retransmission.

26. The retransmission method of claim 20, wherein requesting retransmission to the RS comprises:
transmitting a NACK message to the RS; and
transmitting scheduling information for the data retransmission to the RS.

27. The retransmission method of claim 20, wherein requesting retransmission to the RS comprises:
transmitting scheduling information for the data retransmission to the RS.

28. The retransmission method of claim 20, further comprising:
requesting the data retransmission to the MS, when the NACK is received from the RS.

29. The retransmission method of claim 20, further comprising:
  requesting the data retransmission to the MS, when the MS is selected as the node for the retransmission.

30. The retransmission method of claim 20, further comprising:
  checking a lifetime for the retransmission when the data is retransmission; and
  finishing the data retransmission when the lifetime expires.

31. The retransmission method of claim 20, further comprising:
  comparing signal reception rates of the MS and the RS,
  wherein the data is received from the MS when the signal reception rate of the MS is higher.

32. A retransmission method of a Relay Station (RS) in a wireless relay communication system, the method comprising the steps of:
  identifying scheduling information for a Mobile Station (MS) to send data;
  receiving data from the MS using the scheduling information;
  checking for errors in the received data;
  transmitting an Acknowledgement (ACK) message to a Base Station (BS) when the data has no errors;
  receiving scheduling information for the data transmission, from the BS; and
  transmitting the data to the BS using the received scheduling information.

33. The retransmission method of claim 32, wherein identifying scheduling information comprises:
  identifying scheduling information, which is received from the BS, for the MS to send data.

34. The retransmission method of claim 32, wherein identifying scheduling information comprises:
  acquiring the scheduling information by listening to the scheduling information, which is sent from the BS to the MS, for the data transmission of the MS.

35. The retransmission method of claim 32, further comprising:
  transmitting a Negative ACK (NACK) message to the BS, when data received from the MS has an error.

36. The retransmission method of claim 32, wherein receiving scheduling information comprises:
  receiving a Negative ACK (HACK) message from the BS; and
  receiving scheduling information for the data transmission, from the BS.

37. The retransmission method of claim 32, further comprising:
  checking a lifetime for the retransmission when the data is retransmitted; and
  finishing the data retransmission when the lifetime expires.

38. A Relay Station (RS) of a wireless relay communication system, comprising:
  a checker for checking an error of data received from a Mobile Station (MS);
  a data queue for storing error-free data;
  a retransmission controller for controlling data retransmission according to a retransmission request of a Base Station (BS);
  a data generator for generating data to be retransmitted to the BS using the data stored to the data queue under control of the retransmission controller; and
  a sender for transmitting the generated data to the BS
  wherein the retransmission controller transmits an Acknowledgement (ACK) message to the BS when the data has no errors, receives scheduling information for the data transmission from the BS, and transmits the data to the BS using the received the scheduling information.

39. The RS of claim 38, further comprising:
  a message processor for identifying a retransmission request signal received from the BS,
  wherein the retransmission controller controls to retransmit the data when the message processor confirms the retransmission request signal received from the BS.

40. The RS of claim 38, further comprising:
  a retransmission timer for managing a lifetime for the retransmission when the retransmission is performed under the control of the retransmission controller,
  wherein the retransmission controller finishes the data retransmission when the retransmission lifetime expires.

* * * * *